US012560119B1

(12) United States Patent
Clark et al.

(10) Patent No.: US 12,560,119 B1
(45) Date of Patent: Feb. 24, 2026

(54) WORKING FLUID SYSTEM FOR AIRCRAFT POWERPLANT

(71) Applicant: RTX Corporation, Farmington, CT (US)

(72) Inventors: Thomas E. Clark, Wells, ME (US); Murat Yazici, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/065,689

(22) Filed: Feb. 27, 2025

(51) Int. Cl.
| | |
|---|---|
| *F02C 7/141* | (2006.01) |
| *F02C 6/00* | (2006.01) |
| *F02C 7/06* | (2006.01) |

(52) U.S. Cl.
CPC ............... *F02C 7/141* (2013.01); *F02C 6/00* (2013.01); *F02C 7/06* (2013.01); *F05D 2260/213* (2013.01)

(58) Field of Classification Search
CPC .... F02C 7/00; F02C 7/12; F02C 7/141; F02C 5/06; B64D 33/08; B64D 27/026
See application file for complete search history.

(56) References Cited

U.S. PATENT DOCUMENTS

| | | | | |
|---|---|---|---|---|
| 9,534,538 | B1 * | 1/2017 | Cerny ................... | H02K 7/1823 |
| 9,771,157 | B2 * | 9/2017 | Gagne .................... | B64D 41/00 |
| 11,649,064 | B2 * | 5/2023 | Spierling ............. | B64D 35/025 |
| | | | | 244/53 R |
| 12,139,265 | B2 * | 11/2024 | Freer ...................... | B64D 27/33 |

| | | | | |
|---|---|---|---|---|
| 12,240,615 | B2 * | 3/2025 | Ostdiek .................. | B64D 27/24 |
| 12,241,415 | B1 * | 3/2025 | Keeler ...................... | F02C 7/14 |
| 12,281,614 | B1 * | 4/2025 | Minelli ..................... | F02C 7/36 |
| 12,291,347 | B2 * | 5/2025 | Mark .................... | B64D 27/33 |
| 12,291,998 | B2 * | 5/2025 | Gallagher ............. | B64D 27/10 |
| 2018/0187601 | A1 * | 7/2018 | Segura .................. | F28D 7/0008 |
| 2020/0039654 | A1 * | 2/2020 | Smith .................... | B64D 33/02 |
| 2023/0415905 | A1 * | 12/2023 | Freer .................... | B64D 27/33 |
| 2024/0190574 | A1 * | 6/2024 | Ostdiek .................. | B64D 33/10 |
| 2024/0209780 | A1 * | 6/2024 | Bemment ................. | F23K 5/20 |
| 2024/0209785 | A1 * | 6/2024 | Bemment .............. | F23R 3/005 |
| 2024/0287933 | A1 * | 8/2024 | Gallagher ............... | F02C 7/06 |
| 2024/0301828 | A1 * | 9/2024 | Bemment .............. | F01D 15/10 |
| 2025/0067515 | A1 * | 2/2025 | Ikeda ...................... | F28F 27/02 |

FOREIGN PATENT DOCUMENTS

| | | |
|---|---|---|
| WO | 2024023316 A1 | 2/2024 |
| WO | WO-2025012539 A1 * | 1/2025 |

* cited by examiner

*Primary Examiner* — Craig Kim
(74) *Attorney, Agent, or Firm* — Getz Balich LLC

(57) ABSTRACT

An assembly includes a first powerplant component, a second powerplant component, a first inter-circuit heat exchanger, a first fluid circuit and a second fluid circuit. The first fluid circuit is configured to service the first powerplant component using a first working fluid in the first fluid circuit. The first fluid circuit includes a first circuit reservoir, a first circuit pump and a first circuit path extending through the first circuit reservoir, the first circuit pump and the first inter-circuit heat exchanger. The second fluid circuit is fluidly independent of the first fluid circuit. The second fluid circuit is configured to service the second powerplant component using a second working fluid in the second fluid circuit. The second fluid circuit includes a second circuit reservoir, a second circuit pump and a second circuit path extending through the second circuit reservoir, the second circuit pump and the first inter-circuit heat exchanger.

15 Claims, 11 Drawing Sheets

WORKING FLUID SYSTEM FOR AIRCRAFT POWERPLANT

BACKGROUND OF THE DISCLOSURE

1. Technical Field

This disclosure relates generally to an aircraft and, more particularly, to a working fluid system for a powerplant of the aircraft.

2. Background Information

An aircraft powerplant includes various components which utilize fluid cooling and/or lubrication during aircraft powerplant operation. Various fluid cooling and/or lubrication systems and methods are known in the art. While these known cooling and/or lubrication systems and methods have various benefits, there is still room in the art for improvement.

SUMMARY OF THE DISCLOSURE

According to an aspect of the present disclosure, an assembly is provided for an aircraft powerplant. This assembly includes a first powerplant component, a second powerplant component, a first inter-circuit heat exchanger, a first fluid circuit and a second fluid circuit. The first fluid circuit is configured to service the first powerplant component using a first working fluid in the first fluid circuit. The first fluid circuit includes a first circuit reservoir, a first circuit pump and a first circuit path. The first circuit path extends through the first circuit reservoir, the first circuit pump and the first inter-circuit heat exchanger. The second fluid circuit is fluidly independent of the first fluid circuit. The second fluid circuit is configured to service the second powerplant component using a second working fluid in the second fluid circuit. The second fluid circuit includes a second circuit reservoir, a second circuit pump and a second circuit path. The second circuit path extends through the second circuit reservoir, the second circuit pump and the first inter-circuit heat exchanger.

According to another aspect of the present disclosure, another assembly is provided for an aircraft powerplant. This assembly includes a first powerplant component, a second powerplant component, a first inter-circuit heat exchanger, a first fluid circuit, a second fluid circuit and a third fluid circuit. The first fluid circuit is configured to cool and/or lubricate the first powerplant component using a first working fluid in the first fluid circuit. The first fluid circuit includes a first circuit reservoir, a first circuit pump and a first circuit path extending through the first circuit reservoir and the first circuit pump. The second fluid circuit is fluidly independent of the first fluid circuit. The second fluid circuit is configured to cool and/or lubricate the second powerplant component using a second working fluid in the second fluid circuit. The second fluid circuit includes a second circuit reservoir, a second circuit pump and a second circuit path extending through the second circuit reservoir and the second circuit pump. The third fluid circuit is fluidly independent of the first fluid circuit and the second fluid circuit. The first fluid circuit is thermally coupled to the third fluid circuit such that first heat energy is operable to be transferred between the first working fluid flowing in the first fluid circuit and a third working fluid flowing in the third fluid circuit. The second fluid circuit is thermally coupled to the third fluid circuit such that second heat energy is operable to be transferred between the second working fluid flowing in the second fluid circuit and the third working fluid flowing in the third fluid circuit.

According to still another aspect of the present disclosure, another assembly is provided for an aircraft powerplant. This assembly includes a rotating structure, an electric machine, an electric machine controller and a fluid circuit. The rotating structure includes a bladed rotor. The electric machine is operatively coupled to the rotating structure. The electric machine controller is configured to control operation of the electric machine. The fluid circuit is configured to cool and/or lubricate the electric machine and/or the electric machine controller using a working fluid in the fluid circuit. The fluid circuit includes a circuit path, a circuit reservoir, a circuit pump, a radiator, a fuel-to-working fluid heat exchanger and a lubricant-to-working fluid heat exchanger. The circuit path extends through the circuit reservoir, the circuit pump, the radiator, the fuel-to-working fluid heat exchanger and the lubricant-to-working fluid heat exchanger. The radiator is configured to transfer first heat energy between the working fluid and air flowing through the radiator. The fuel-to-working fluid heat exchanger is configured to transfer second heat energy between the working fluid and fuel flowing through the fuel-to-working fluid heat exchanger. The lubricant-to-working fluid heat exchanger is configured to transfer third heat energy between the working fluid and lubricant flowing through the lubricant-to-working fluid heat exchanger.

The circuit pump may be a first circuit pump. The fluid circuit may also include a second circuit pump fluidly coupled inline along the circuit path next to the first circuit pump.

The fluid circuit may be a first fluid circuit configured to cool and/or lubricate the electric machine. The working fluid may be a first working fluid. The assembly may also include a second fluid circuit and an inter-circuit heat exchanger. The second fluid circuit may be fluidly independent of the first fluid circuit. The second fluid circuit may be configured to service the electric machine controller using a second working fluid in the second fluid circuit. The second fluid circuit may include a second circuit path, a second circuit reservoir and a second circuit pump. The second circuit path may extend through the second circuit reservoir and the second circuit pump. The inter-circuit heat exchanger may be fluidly coupled inline along the first fluid circuit and the second fluid circuit.

The assembly may also include an inter-circuit heat exchanger configured to: transfer the first heat energy between the first working fluid flowing in the first fluid circuit and the third working fluid flowing in the third fluid circuit; and transfer the second heat energy between the second working fluid flowing in the second fluid circuit and the third working fluid flowing in the third fluid circuit.

The third working fluid may be fuel.

The third working fluid may be lubricant.

The third working fluid may be a liquid working fluid.

The first fluid circuit may be configured to cool and/or lubricate the first powerplant component using the first working fluid in the first fluid circuit. In addition or alternatively, the second fluid circuit may be configured to cool and/or lubricate the second powerplant component using the second working fluid in the second fluid circuit.

The first inter-circuit heat exchanger may be dedicated to transferring heat energy between the first working fluid in the first fluid circuit and the second working fluid in the second fluid circuit.

The assembly may also include a lubricant circuit. The lubricant circuit may include a lubricant circuit path extending through the first inter-circuit heat exchanger.

The assembly may also include a fuel circuit. The fuel circuit may include a fuel circuit path extending through the first inter-circuit heat exchanger.

The assembly may also include a second inter-circuit heat exchanger and a lubricant circuit. The second inter-circuit heat exchanger may be fluidly coupled inline along the first circuit path and the second circuit path. The lubricant circuit may include a lubricant circuit path extending through the second inter-circuit heat exchanger.

The first fluid circuit may include a first circuit heat exchanger. The first circuit path may also extend through the first circuit heat exchanger. The second fluid circuit may also include a second circuit heat exchanger. The second circuit path may also extend through the second circuit heat exchanger.

The first circuit heat exchanger may be fluidly independent of the second fluid circuit. The second circuit heat exchanger may be fluidly independent of the first fluid circuit.

The first circuit path may also extend through the first powerplant component. In addition or alternatively, the second circuit path may also extend through the second powerplant component.

The assembly may also include a first component heat exchanger and/or a second component heat exchanger. The first component heat exchanger may thermally couple the first powerplant component to the first working fluid in the first fluid circuit. The first circuit path may also extend through the first component heat exchanger. The second component heat exchanger may thermally couple the second powerplant component to the second working fluid in the second fluid circuit. The second circuit path may also extend through the second component heat exchanger.

The first powerplant component may be configured as or otherwise include a first electric device. The second powerplant component may be configured as or otherwise include a second electric device.

The assembly may also include a first electric machine and a second electric machine. The first electric machine may be configured as or otherwise include the first powerplant component. The second electric machine may be configured as or otherwise include the second powerplant component.

The assembly may also include a first electric machine controller and a second electric machine controller. The first electric machine controller may be configured as or otherwise include the first powerplant component. The second electric machine controller may be configured as or otherwise include the second powerplant component.

The assembly may also include an electric machine and an electric machine controller. The electric machine may be configured as or otherwise include the first powerplant component. The electric machine controller may be configured as or otherwise include the second powerplant component.

The electric machine controller may be configured to control operation of the electric machine.

The first circuit pump may be configured with the first powerplant component in a first line replaceable unit. In addition or alternatively, the second circuit pump may be configured with the second powerplant component in a second line replaceable unit.

The first circuit pump may be arranged remote from the first powerplant component. In addition or alternatively, the second circuit pump may be arranged remote from the second powerplant component.

The first circuit reservoir may be configured with the first powerplant component in a first line replaceable unit. In addition or alternatively, the second circuit reservoir may be configured with the second powerplant component in a second line replaceable unit.

The first circuit reservoir may be arranged remote from the first powerplant component. In addition or alternatively, the second circuit reservoir is arranged remote from the second powerplant component.

The first fluid circuit may also include an additional first circuit pump fluidly coupled inline along the first circuit path.

The additional first circuit pump may be arranged next to the first circuit pump along the first circuit path.

The assembly may also include a first rotating structure, a second rotating structure and a second electric machine. The first rotating structure may include a bladed first rotor. The first powerplant component may include a first electric machine operatively coupled to the first rotating structure. The second rotating structure may include a bladed second rotor. The second rotating structure may be rotationally independent of the first rotating structure. The second electric machine may be operatively coupled to the second rotating structure. The first fluid circuit may also be configured to service the second electric machine using the first working fluid in the first fluid circuit.

The assembly may also include a first electric machine controller and a second electric machine controller. The first electric machine controller may be configured to control operation of the first electric machine. The first electric machine controller may include the second powerplant component. The second electric machine controller may be configured to control operation of the second electric machine. The second fluid circuit may also be configured to service the second electric machine controller using the second working fluid in the second fluid circuit.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
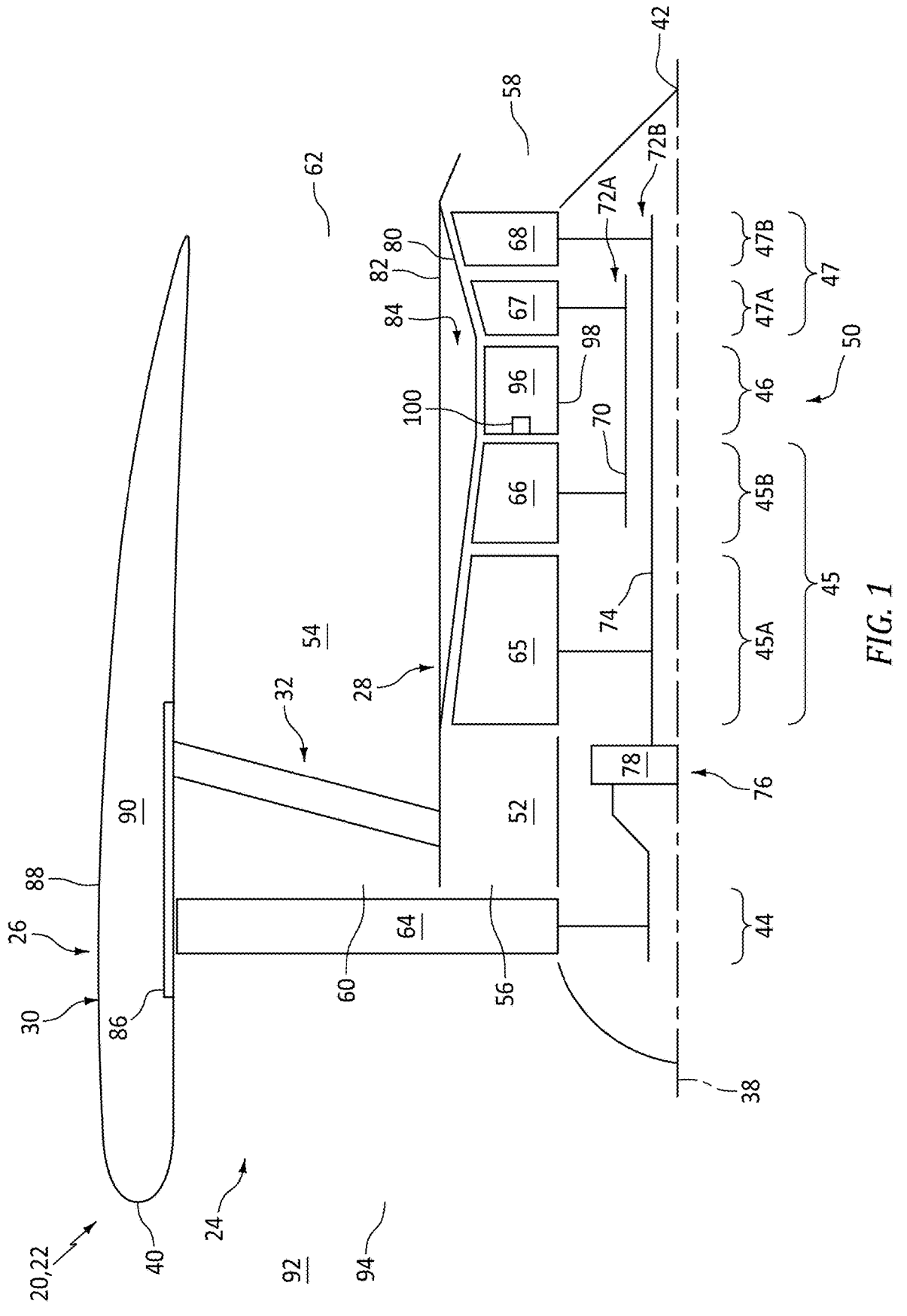
FIG. 1 is a partial schematic illustration of an aircraft propulsion system with a ducted propulsor rotor.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and a working fluid system 36 (see FIG. 3). The aircraft propulsion system 22 extends axially along an axis 38 between an axial upstream, forward end 40 of the aircraft propulsion system 22 and an axial downstream, aft end 42 of the aircraft propulsion system 22. Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. At least (or only) the LPC section 45A, the HPC section 45B, the combustor section 46, the HPT section 47A and the LPT section 47B collectively form a core 50 (e.g., a gas generator) of the turbine engine 24. The aircraft propulsion system 22 and its turbine engine 24 of FIG. 1 also include a core flowpath 52 (e.g., an annular core flowpath) and a bypass flowpath 54 (e.g., an annular bypass flowpath). The core flowpath 52 extends sequentially through the LPC section 45A, the HPC section 45B, the combustor section 46, the HPT section 47A and the LPT section 47B from an airflow inlet 56 into the core flowpath 52 to a combustion products exhaust 58 out from the core flowpath 52. The bypass flowpath 54 extends through a bypass duct from an airflow inlet 60 into the bypass flowpath 54 to an airflow exhaust 62 from the bypass flowpath 54, where the bypass duct may be formed by the inner housing structure 28 and the outer housing structure 30. The bypass flowpath 54 and its bypass duct are configured to bypass (e.g., are disposed radially outboard of and extend along) the engine core 50 and the inner housing structure 28.

The propulsor section 44, the LPC section 45A, the HPC section 45B, the combustor section 46, the HPT section 47A and the LPT section 47B may be arranged sequentially along the propulsion system axis 38 within the propulsion system housing 26. The propulsor section 44 includes a bladed propulsor rotor 64; e.g., a fan rotor. The LPC section 45A includes a bladed low pressure compressor (LPC) rotor 65. The HPC section 45B includes a bladed high pressure compressor (HPC) rotor 66. The HPT section 47A includes a bladed high pressure turbine (HPT) rotor 67. The LPT section 47B includes a bladed low pressure turbine (LPT) rotor 68. Each of these engine rotors 64-68 includes a rotor base (e.g., a disk or a hub) and a plurality of rotor blades (e.g., airfoils, vanes, etc.). The rotor blades may be arranged into one or more stages axially along the respective engine rotor 64-68. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 66 is coupled to and rotatable with the HPT rotor 67. The HPC rotor 66 of FIG. 1, for example, is connected to the HPT rotor 67 through a high speed shaft 70. At least (or only) the HPC rotor 66, the HPT rotor 67 and the high speed shaft 70 collectively form a high speed rotating structure 72A; e.g., a high speed spool of the turbine engine 24 and its engine core 50. This high speed rotating structure 72A of FIG. 1 and its members 66, 67 and 70 are rotatable about the propulsion system axis 38. However, it is contemplated the high speed rotating structure 72A may alternatively be rotatable about another axis radially and/or angularly offset from the rotational axis of the propulsor rotor 64 and/or the centerline axis of the turbine engine 24.

The LPC rotor 65 is coupled to and rotatable with the LPT rotor 68. The LPC rotor 65 of FIG. 1, for example, is connected to the LPT rotor 68 through a low speed shaft 74. At least (or only) the LPC rotor 65, the LPT rotor 68 and the low speed shaft 74 collectively form a low speed rotating structure 72B; e.g., a low speed spool of the turbine engine 24 and its engine core 50. This low speed rotating structure 72B of FIG. 1 and its members 65, 68 and 74 are rotatable about the propulsion system axis 38. However, it is contemplated the low speed rotating structure 72B may alternatively be rotatable about another axis radially and/or angularly offset from the rotational axis of the propulsor rotor 64 and/or the centerline axis of the turbine engine 24.

The low speed rotating structure 72B is coupled to the propulsor rotor 64 through a propulsor drivetrain 76. The propulsor drivetrain 76 may be configured as a geared drivetrain, where a geartrain 78 (e.g., a transmission, a speed change device, an epicyclic geartrain, etc.) is disposed between and operatively couples the propulsor rotor 64 to the low speed rotating structure 72B and its LPT rotor 68. With this arrangement, the propulsor rotor 64 may rotate at a different (e.g., slower) rotational speed than the low speed rotating structure 72B and its LPT rotor 68. Here, the propulsor rotor 64 and the low speed rotating structure 72B may rotate in a common (the same) direction about the propulsion system axis 38 or in opposite directions about the propulsion system axis 38 depending, for example, upon the specific configuration of the geartrain 78. Alternatively, the propulsor drivetrain 76 may be configured as a direct-drive drivetrain, where the geartrain 78 is omitted. With such an arrangement, the propulsor rotor 64 rotates at a common (the same) rotational speed as the low speed rotating structure 72B and its LPT rotor 68.

The inner housing structure 28 of FIG. 1 includes an inner case 80 (e.g., a core case) for the turbine engine 24, an inner nacelle structure 82 (sometimes referred to as an inner fixed structure (IFS)) and an internal inner housing compartment 84 (e.g., an engine core compartment). The inner case 80 is disposed radially outboard of, extends axially along and may circumscribe one or more or all of the engine sections 45A-47B and the engine rotors 65-68. The inner case 80 may thereby house and provide a support structure for the respective engine sections 45A-47B and the engine rotors 65-68. The inner nacelle structure 82 is configured to provide an aerodynamic cover over the engine core 50 and its inner case 80. At least (or only) the inner housing structure 28 and its inner nacelle structure 82 may collectively form a radial inner peripheral boundary of the bypass flowpath 54. The inner housing compartment 84 of FIG. 1 is formed by and is disposed radially between the inner case 80 and an inner barrel of the inner nacelle structure 82.

The outer housing structure 30 of FIG. 1 includes an outer case 86 (e.g., a fan case) for the turbine engine 24, an outer nacelle structure 88 and an internal outer housing compartment 90. The outer case 86 is disposed radially outboard of, extends axially along and may circumscribe the propulsor section 44 and its propulsor rotor 64. The outer case 86 may thereby house and may be configured as a containment structure for the propulsor section 44 and its propulsor rotor 64. The outer nacelle structure 88 is configured to provide an aerodynamic cover over the outer case 86. At least (or only) the outer housing structure 30 and its outer nacelle structure 88 may collectively form a radial outer peripheral boundary of the bypass flowpath 54. The outer housing compartment 90 of FIG. 1 is formed by and is disposed radially between the outer case 86 and the outer nacelle structure 88; e.g., outer cowls of the outer nacelle structure 88.

During operation of the aircraft propulsion system 22 of FIG. 1, ambient air from an environment 92 external to the aircraft and its aircraft propulsion system 22 enters the aircraft propulsion system 22 and its turbine engine 24 through an airflow inlet 94. This air is propelled by the rotating propulsor rotor 64 in a downstream, aft direction towards the propulsion system aft end 42.

An outer stream of the air propelled by the rotating propulsor rotor 64 is directed into the bypass flowpath 54 through its bypass inlet 60, which air entering the bypass flowpath 54 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 62 to provide forward thrust. The propulsion of the bypass air may account for a majority of the forward thrust generated by the aircraft propulsion system 22 and its turbine engine 24 of FIG. 1.

An inner stream of the air propelled by the rotating propulsor rotor 64 is directed into the core flowpath 52 through its core inlet 56, which air entering the core flowpath 52 may be referred to as "core air". This core air is compressed by the LPC rotor 65 and the HPC rotor 66 and is directed into a combustion chamber 96 (e.g., annular combustion chamber) of a combustor 98 (e.g., annular combustor) in the combustor section 46. Fuel is injected into the combustion chamber 96 by one or more fuel injectors 100 and mixed with the compressed core air to provide a fuel-air mixture. This fuel-air mixture is ignited and combustion products thereof flow through and sequentially drive rotation of the HPT rotor 67 and the LPT rotor 68. The rotation of the HPT rotor 67 and the LPT rotor 68 respectively drive rotation of the HPC rotor 66 and the LPC rotor 65 and, thus, compression of the air received from the core inlet 56. The rotation of the LPT rotor 68 also drives rotation of the propulsor rotor 64 through the propulsor drivetrain 76.

Figure 2:
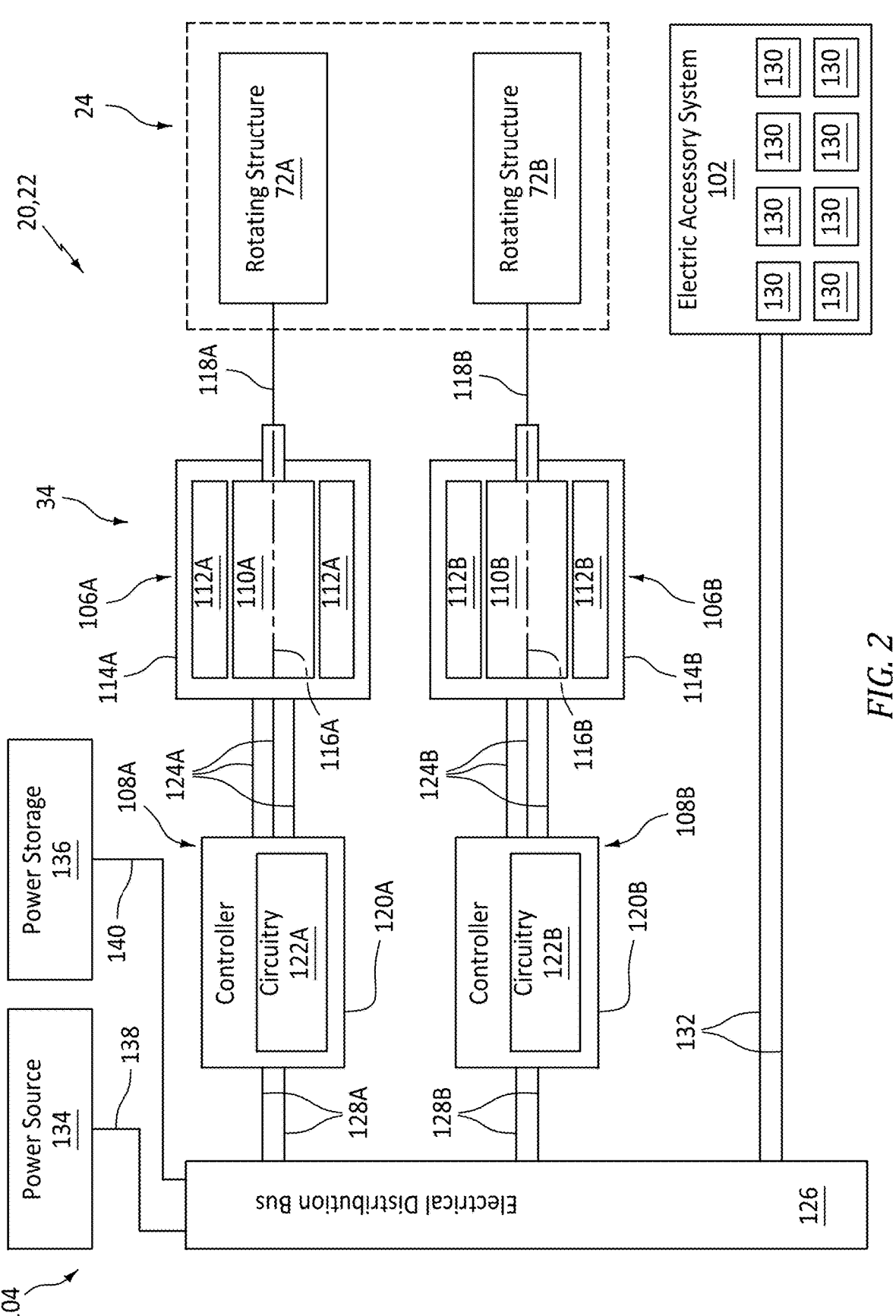
FIG. 2 is a schematic illustration of a portion of the aircraft propulsion system with an electric machine system.

Referring to FIG. 2, the electric machine system 34 is electrically coupled to an optional electric accessory system 102 and an electrical system 104 for the aircraft and its aircraft propulsion system 22. The electric machine system 34 of FIG. 2 includes one or more electric machines 106A and 106B (generally referred to as "106") and one or more electric machine (EM) controllers 108A and 108B (generally referred to as "108"). For ease of description, each electric machine 106 of FIG. 2 is described below as being electrically coupled to, controlled by and/or otherwise associated with a single, dedicated EM controller 108. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with the single electric machine.

Each electric machine 106A, 106B of FIG. 2 includes an electric machine rotor 110A, 110B (generally referred to as "110"), an electric machine stator 112A, 112B (generally referred to as "112") and an electric machine housing 114A, 114B (generally referred to as "114"); e.g., a case. The machine rotor 110A, 110B is rotatable about a rotational axis 116A, 116B (generally referred to as "116") of the respective machine rotor 110A, 110B, which electric machine (EM) axis 116 may also be a centerline axis of the respective electric machine 106. The machine stator 112 of FIG. 2 is radially outboard of and circumscribes the machine rotor 110. With this arrangement, each electric machine 106 is configured as a radial flux electric machine. The electric machines 106 of the present disclosure, however, are not limited to such an exemplary rotor-stator configuration nor to radial flux arrangements. The machine rotor 110, for example, may alternatively be radially outboard of and circumscribe the machine stator 112. In another example, the machine rotor 110 may be axially next to the machine stator 112 configuring the electric machine 106 as an axial flux electric machine. Referring again to FIG. 2, the machine rotor 110 and the machine stator 112 are at least partially or completely housed within an interior of the machine housing 114.

Each electric machine 106A, 106B may be operatively coupled to a respective one of the engine rotating structures 72A, 72B (generally referred to as "72"). Each machine rotor 110A, 110B of FIG. 2, for example, is mechanically coupled to and rotatable with the respective engine rotating structure 72A, 72B through an engine-electric machine drivetrain 118A, 118B (generally referred to as "118"). This engine-electric machine drivetrain 118 may be configured as or otherwise include a shaft, a tower shaft assembly, an accessory gearbox, a multi-speed or variable speed transmission, an angle gearbox, and/or the like. For case of description, each machine rotor 110 of FIG. 2 is described below as being coupled to and rotatable with a unique one of the engine rotating structures 72 of the turbine engine 24. However, it is contemplated multiple machine rotors may alternatively be coupled to and rotatable with a common engine rotating structure; e.g., 72A or 72B. It is also contemplated a single one of the machine rotors may be coupled to and rotatable with multiple engine rotating structures, directly or through another device such as a differential or a clutch system. In addition, while the electric machines 106 are described above as being coupled to the engine rotating structures 72, it is contemplated the machine rotor 110 of one or more of the electric machines 106 may also or alternatively be operatively coupled to another rotating device through the engine-electric machine drivetrain 118 such as, but not limited to, a pump rotor, an auxiliary compressor rotor, an actuator rotor, or the like.

Each electric machine 106 of FIG. 2 may be configurable as an electric motor and/or an electric generator; e.g., an electric motor-generator. For example, during a respective motor mode of operation, each electric machine 106 may operate as the electric motor to convert electricity received from the aircraft electrical system 104 into mechanical power. The machine stator 112, for example, may generate an electromagnetic field with the machine rotor 110 using a current of electricity received from the aircraft electrical system 104 through the respective EM controller 108. This electromagnetic field may drive rotation of the machine rotor 110. The machine rotor 110, in turn, may provide mechanical power to and drive rotation of the respective engine rotating structure 72 through the respective engine-electric machine drivetrain 118. This mechanical power may be provided to boost power or completely power the rotation of the respective engine rotating structure 72. By contrast, during a respective generator mode of operation, each electric machine 106 may operate as the electric generator to convert mechanical power received from the respective engine rotating structure 72 into electricity. Rotation of the machine rotor 110, for example, may be rotationally driven by rotation of the respective engine rotating structure 72 through the engine-electric machine drivetrain 118. The rotation of the machine rotor 110 may generate an electromagnetic field with the machine stator 112, and the machine stator 112 may convert energy from the electromagnetic field into electricity. The electric machine 106 may then provide a current of electricity to the aircraft electrical system 104 through the respective EM controller 108 for storage and/or further use. The electric machines 106 of the present disclosure, however, are not limited to such exemplary operation. For example, one or more of the electric machines 106 may each alternatively be configured as a dedicated electric generator; e.g., without the electric motor functionality. In another example, one or more of the electric machines 106 may each alternatively be configured as a dedicated electric motor; e.g., without the electric generator functionality.

Each EM controller 108A, 108B includes a controller housing 120A, 120B (generally referred to as "120") and internal controller circuitry 122A, 122B (generally referred to as "122"). The controller housing 120 may be configured as an enclosed case (e.g., a closed or sealed container) for the respective controller circuitry 122. The controller circuitry 122 is disposed within an interior of the respective controller housing 120; e.g., an internal chamber or other volume(s) within and enclosed by the controller housing 120. The controller circuitry 122 includes various electrical components, connectors and the like. Examples of the electrical components include, but are not limited to, printed circuit board(s) (PCB(s)), electrical inductor(s), electrical inverter (s), electrical amplifier(s), electrical switch(es) (e.g., contactor(s), relay(s), etc.), processing device(s), memory module(s), communication module(s), electrical transformer(s), electrical rectifier(s), and/or the like.

Each EM controller 108A, 108B is electrically coupled to the respective electric machine 106A, 106B through one or more electric cables 124A, 124B (generally referred to as "124"); e.g., high voltage electric cables, power feeder cables, etc. More particularly, the controller circuitry 122 of each EM controller 108 is electrically coupled to the respective electric machine 106 and its machine stator 112 through the respective electric cables 124. Similarly, each EM controller 108A, 108B is electrically coupled to an electrical distribution bus 126 of the aircraft electrical system 104 through one or more electric cables 128A, 128B (generally referred to as "128"); e.g., high voltage electric cables, power feeder cables, etc. More particularly, the controller circuitry 122 of each EM controller 108 is electrically coupled to the aircraft electrical system 104 and its electrical distribution bus 126 through the respective electric cables 128.

Each EM controller 108 and its controller circuitry 122 are configured to control operation of the respective electric machine 106. For example, when operating as the electric motor, each EM controller 108 and its controller circuitry 122 are configured to regulate a flow of electricity from the aircraft electrical system 104 to the respective electric machine 106. This electricity flow regulation may include: (a) turning-on the flow of electricity from the aircraft electrical system 104 to the respective electric machine 106 (e.g., electrically coupling the respective electric machine 106 to the aircraft electrical system 104); (b) turning-off the flow of electricity from the aircraft electrical system 104 to the respective electric machine 106 (e.g., electrically decoupling the respective electric machine 106 from the aircraft electrical system 104); (c) moderating the flow of electricity from the aircraft electrical system 104 to the respective electric machine 106. Here, each EM controller 108 operates as a motor controller. In another example, when operating as the electric generator, each EM controller 108 and its controller circuitry 122 are configured to regulate a flow of electricity from the respective electric machine 106 to the aircraft electrical system 104. This electricity flow regulation may include: (a) turning-on the flow of electricity from the respective electric machine 106 to the aircraft electrical system 104 (e.g., electrically coupling the respective electric machine 106 to the aircraft electrical system 104); (b) turning-off the flow of electricity from the respective electric machine 106 to the aircraft electrical system 104 (e.g., electrically decoupling the respective electric machine 106 from the aircraft electrical system 104); (c) moderating the flow of electricity from the respective electric machine 106 to the aircraft electrical system 104. Here, the EM controller 108 operates as a generator controller.

The electric accessory system 102 includes one or more electric devices 130. The electric devices 130 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 130 of FIG. 2 may be configured as part of one or more sub-systems for the aircraft propulsion system 22 and its turbine engine 24. Examples of these sub-systems include, but are not limited to: a fuel system for delivering the fuel to the fuel injectors 100 (see FIG. 1); a lubrication system for delivering lubricant (e.g., oil) to one or more lubricated components (e.g., bearing(s), gear system (s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices.

Each electric device 130 is electrically coupled to the electrical distribution bus 126 of the aircraft electrical system 104 through one or more electric cables 132 (collectively schematically shown); e.g., high voltage electric cables, low voltage electric cables, power feeder cables, etc. Each electric device 130 may thereby receive a current of electricity from the aircraft electrical system 104 to power operation thereof.

The aircraft electrical system 104 includes the electrical distribution bus 126. This aircraft electrical system 104 may also include a power source 134 and/or a power storage 136. The electrical distribution bus 126 is electrically coupled to each electric machine 106 through the respective EM controller 108. The electrical distribution bus 126 is electrically coupled to each of the electric devices 130. The electrical distribution bus 126 is also electrically coupled to the power source 134 and the power storage 136, respectively schematically shown via lines 138 and 140. With this arrangement, the electrical distribution bus 126 provides an intermediate connection between the various electrical aircraft propulsion system members 106A (via 108A), 106B (via 108B), 130, 134 and/or 136. The power source 134 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 136 is configured to receive electricity from the electrical distribution bus 126 for storage. The power storage 136 is also configured to provide the stored electricity to the electrical distribution bus 126. The power storage 136, for example, may be configured as or otherwise include one or more electricity storage devices; e.g., batteries, super capacitors, etc. With the foregoing aircraft electrical system arrangement, the electrical current provided to one, some or all of the electric devices 130 may be received, through the electrical distribution bus 126, from any one, some or all of the electrical aircraft propulsion system members 106A, 106B, 134 and/or 136. It is also contemplated the electrical current provided to one of the electric machines (e.g., 106A or 106B) may be received from another one of the electric machines (e.g., 106B or 106A) through the aircraft electrical system 104 and its electrical distribution bus 126.

Figure 3:
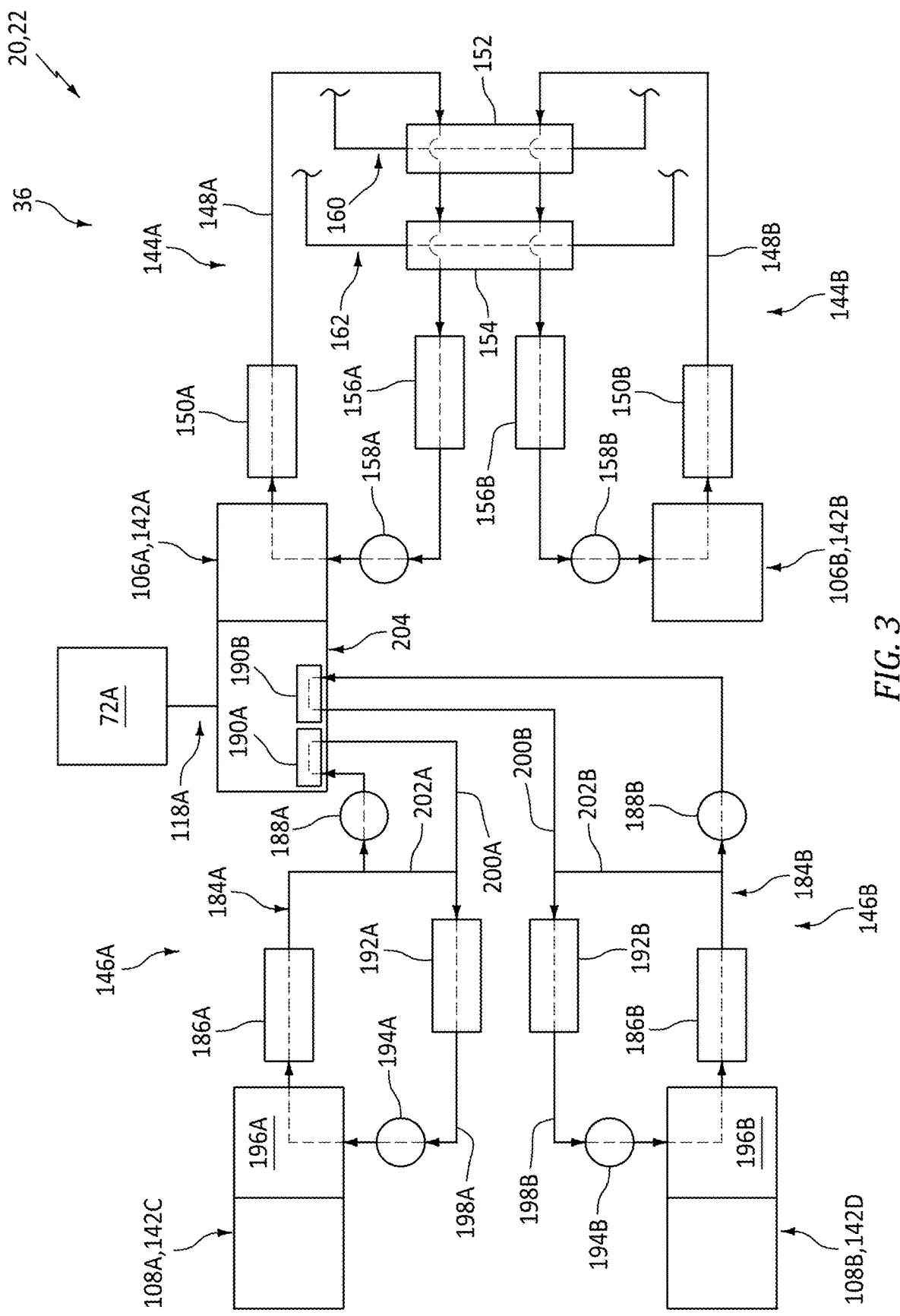
FIG. 3 is a schematic illustration of a portion of the aircraft propulsion system with a working fluid system.

Referring to FIG. 3, the working fluid system 36 is configured to service (e.g., cool and/or lubricate) various components 142A, 142B, 142C and/or 142D (generally referred to as "142") of the aircraft powerplant 20 and its aircraft propulsion system 22. The working fluid system 36 of FIG. 3, for example, is configured as a heat exchange and/or lubrication system for the powerplant components 142. For case of description, the first powerplant component 142A is described below as the first electric machine 106A, the second powerplant component 142B is described below as the second electric machine 106B, the third powerplant component 142C is described below as the first EM controller 108A, and the fourth powerplant component 142D is described below as the second EM controller 108B. The working fluid system 36 of the present disclosure, however, is not limited to such an exemplary arrangement. For example, it is contemplated (a) placement of the electric machines 106A and 106B may be reversed, (b) placement of the EM controllers 108A and 108B may be reversed, (c) placement of the electric devices 106A and 108A may be reversed and/or (d) placement of the electric devices 106B and 108B may be reversed.

The working fluid system 36 of FIG. 3 includes a plurality of discrete fluid circuits 144A and 144B (generally referred to as "144") and 146A and 146B (generally referred to as "146"); e.g., fluidly decoupled circuits, fluidly independent circuits, etc. Each fluid circuit 144, 146 of FIG. 3 is configured to service (e.g., cool and/or lubricate) a respective one of the powerplant components 142. The fluid circuit 144A of FIG. 3, for example, is configured to cool and/or lubricate the first electric machine 106A (the first powerplant component 142A) using a working fluid; e.g., a liquid working fluid such as lubricant, coolant, hydraulic fluid, etc. The fluid circuit 144A and its working fluid are thereby respectively referred to below as the first electric machine (EM) fluid circuit and the first electric machine (EM) working fluid for case of description. The fluid circuit 144B of FIG. 3 is configured to cool and/or lubricate the second electric machine 106B (the second powerplant component 142B) using a working fluid; e.g., a liquid working fluid such as lubricant, coolant, hydraulic fluid, etc. The fluid circuit 144B and its working fluid are thereby respectively referred to below as the second electric machine (EM) fluid circuit and the second electric machine (EM) working fluid for ease of description. The fluid circuit 146A of FIG. 3 is configured to cool the first EM controller 108A (the third powerplant component 142C) using a working fluid; e.g., a liquid working fluid such as lubricant, coolant, hydraulic fluid, etc. The fluid circuit 146A and its working fluid are thereby respectively referred to below as the first controller fluid circuit and the first controller working fluid for case of description. The fluid circuit 146B of FIG. 3 is configured to cool the second EM controller 108B (the fourth powerplant component 142D) using a working fluid; e.g., a liquid working fluid such as lubricant, coolant, hydraulic fluid, etc. The fluid circuit 146B and its working fluid are thereby respectively referred to below as the second controller fluid circuit and the second controller working fluid for ease of description. The present disclosure, however, is not limited to such an exemplary arrangement as described above. Moreover, it is contemplated any one, some or all of the fluid circuits 144, 146 may (or may not) also each service (e.g., cool and/or lubricate) one or more additional components of the aircraft powerplant 20 and its aircraft propulsion system 22.

By dividing the working fluid system 36 into the discrete fluid circuits 144A, 144B, 146A and 146B, each fluid circuit 144, 146 may be individually tuned based on cooling and/or lubrication requirements its serviced powerplant component 142 (or powerplant components). For example, the first EM fluid circuit 144A may be tuned for specific heat loads generated by the first electric machine 106A (the first powerplant component 142A) and/or a working temperature range for the first electric machine 106A (the first powerplant component 142A). The second EM fluid circuit 144B may be tuned for specific heat loads generated by the second electric machine 106B (the second powerplant component 142B) and/or a working temperature range for the second electric machine 106B (the second powerplant component 142B). The first controller fluid circuit 146A may be tuned for specific heat loads generated by the first EM controller 108A (the third powerplant component 142C) and/or a working temperature range for the first EM controller 108A (the third powerplant component 142C). The second controller fluid circuit 146B may be tuned for specific heat loads generated by the second EM controller 108B (the fourth powerplant component 142D) and/or a working temperature range for the second EM controller 108B (the fourth powerplant component 142D). To this end, the working temperature range for the electric machines 106A and 106B may be different (e.g., higher) than the working temperature range for the EM controllers 108A and 108B. Moreover, while the first EM working fluid, the second EM working fluid, the first controller working fluid and the second controller working fluid may have a common composition (e.g., the same chemical constituent(s)), some or all of these working fluids may alternatively have different compositions (e.g., chemical constituent(s)) to further tune one or more heat exchange and/or lubrication parameters for the respective fluid circuit 144, 146. Similarly, while the fluid circuits 144, 146 may share one or more common operational parameters (e.g., flow rate, pressure, etc.), some or all of these fluid circuits 144A, 144B, 146A and/or 146B may alternatively have different operational parameters further tuned for the respective set of powerplant components 142.

In addition to the foregoing, by providing each powerplant component 142A, 142B, 142C, 142D with a dedicated fluid circuit 144A, 144B, 146A, 146B, potential debris, flow blockages, etc. associated with one of the fluid circuits 144, 146 may not affect operation of the other fluid circuit(s) 144, 146. With this in mind, in an unlikely event a component (e.g., a pump, a valve, etc.) of the first EM fluid circuit 144A (or alternatively the second EM fluid circuit 144B) fails or is otherwise operationally derated (e.g., reduced in operational capacity, efficiency, etc.), operation of the first electric machine 106A serviced by that first EM fluid circuit 144A may also be operationally derated or turned-off; e.g., depowered, disconnected, disengaged, etc. However, since the second electric machine 106B is serviced by the discrete second EM fluid circuit 144B, the second electric machine 106B may continue to operate unaffected by the non-operational or derated first EM fluid circuit 144A. In addition, it is contemplated the second electric machine 106B may be operated to provide redundancy for the derated or turned-off first electric machine 106A. Similarly, in an unlikely event a component (e.g., a pump, a valve, etc.) of the first controller fluid circuit 146A (or alternatively the second controller fluid circuit 146B) fails or is otherwise operationally derated (e.g., reduced in operational capacity, efficiency, etc.), operation of the first EM controller 108A serviced by that first controller fluid circuit 146A may also be operationally derated or turned-off; e.g., depowered, disconnected, disengaged, etc. However, since the second EM controller 108B is serviced by the discrete second controller fluid circuit 146B, the second EM controller 108B may continue to operate unaffected by the non-operational or derated first controller fluid circuit 146A.

Figure 4:
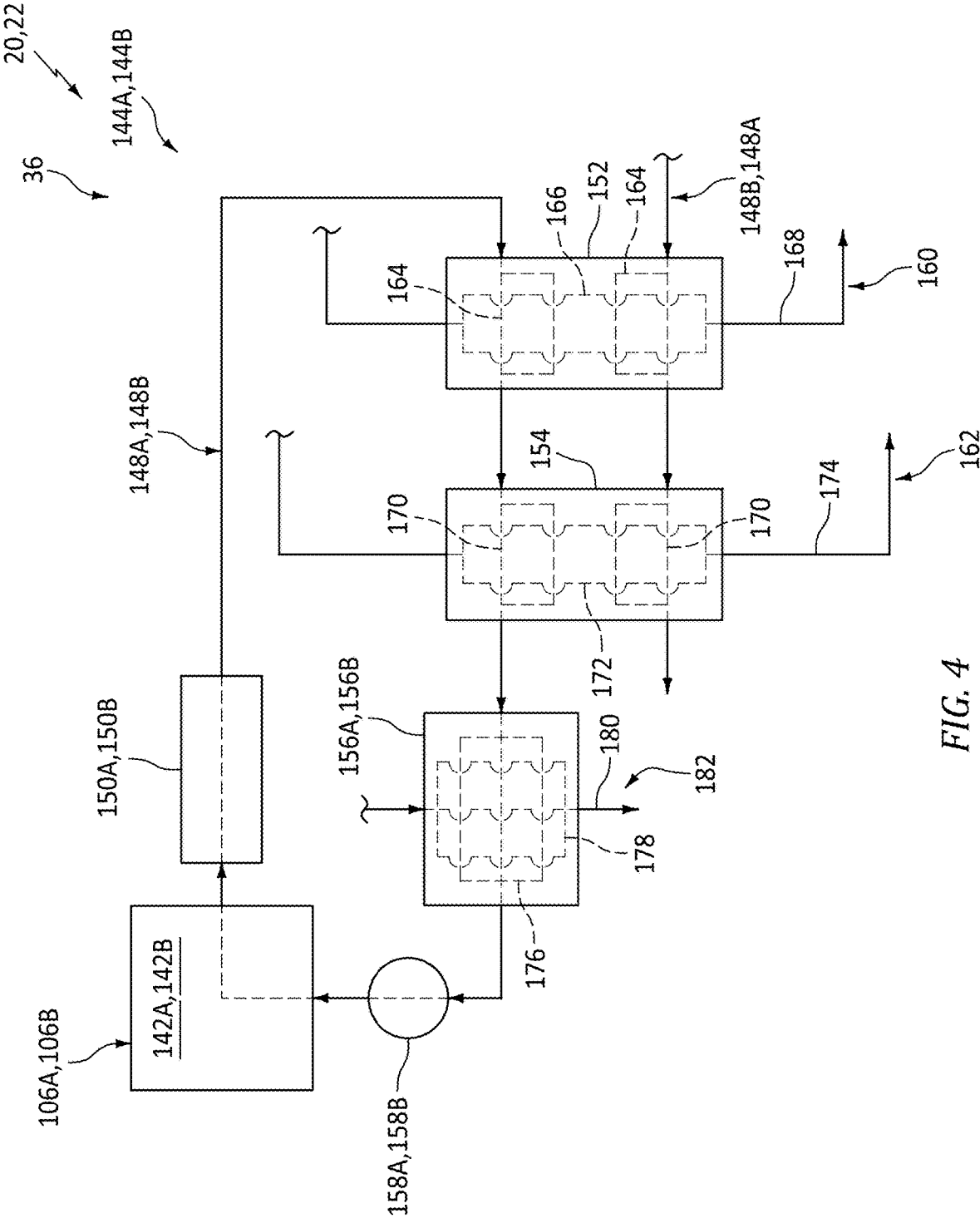
FIG. 4 is a schematic illustration of a portion of the aircraft propulsion system at an electric machine (EM) fluid circuit.

Referring to FIG. 4, each EM fluid circuit 144A, 144B includes an electric machine (EM) circuit path 148A, 148B (generally referred to as "148"), which EM circuit path 148 is discrete (e.g., fluidly decoupled, fluidly independent) from the other fluid circuits 144, 146 of FIG. 3. Each EM fluid circuit 144A, 144B includes an electric machine (EM) circuit reservoir 150A, 150B (generally referred to as "150"), one or more electric machine (EM) circuit heat exchangers 152, 154 and/or 156A, 156B (generally referred to as "156") and an electric machine (EM) circuit pump 158A, 158B (generally referred to as "158"). The EM circuit members 150, 156 and 158 in each EM fluid circuit 144 may be structurally and/or operationally independent from the like EM circuit members 150, 156 and 158 in the other EM fluid circuit 144. By contrast, the first EM fluid circuit 144A and the second EM fluid circuit 144B may share one or more of the EM circuit heat exchangers 152 and/or 154. The EM circuit lubricant-to-working fluid (LWF) heat exchanger 152 and the EM circuit fuel-to-working fluid (FWF) heat exchanger 154 of FIG. 4, for example, are configured as inter-circuit heat exchangers which are shared by and may thermally couple the first EM fluid circuit 144A and the second EM fluid circuit 144B together. Briefly, the EM circuit LWF heat exchanger 152 is also configured as part of a discrete lubricant circuit 160 for the aircraft propulsion system 22 and its turbine engine 24 (see FIG. 1), which lubricant circuit 160 may service (e.g., cool and/or lubricate) various components within the aircraft propulsion system 22 and its turbine engine 24 (see FIG. 1). Examples of these engine components include, but are not limited to, engine bearing(s) supporting the low speed rotating structure 72B (see FIG. 1), engine bearing(s) supporting the high speed rotating structure 72A (see FIG. 1), engine bearing(s) supporting the propulsor rotor 64 (see FIG. 1), internal component(s) of and/or support components for the geartrain 78 (see FIG. 1), internal component(s) of and/or support components for the engine-electric machine drivetrain(s) 118 (see FIG. 2), lubricated seal member(s), and/or engine heat exchanger(s). The EM circuit FWF heat exchanger 154, on the other hand, is also configured as part of a discrete fuel circuit 162 for the aircraft propulsion system 22 and its turbine engine 24 (see FIG. 1), which fuel circuit 162 may deliver fuel to the combustor section 46 and its fuel injectors 100 (see FIG. 1) to facilitate turbine engine operation. Of course, it is contemplated each EM fluid circuit 144 may (or may not) also include one or more additional components arranged along its respective EM circuit path 148 such as, but not limited to, filter(s), sensor(s), additional heat exchanger(s), additional powerplant component(s), valve(s), pump(s), etc.

In each EM fluid circuit 144, the EM circuit reservoir 150, a portion of the EM circuit LWF heat exchanger 152, a portion of the EM circuit FWF heat exchanger 154, the EM circuit heat exchanger 156 and the EM circuit pump 158 may be arranged inline along the respective EM circuit path 148. Each EM circuit path 148 of FIG. 4, for example, extends serially through the EM circuit reservoir 150, the respective portion of the EM circuit LWF heat exchanger 152, the respective portion of the EM circuit FWF heat exchanger 154, the EM circuit heat exchanger 156 and the EM circuit pump 158 in a closed loop. Each EM circuit path 148 is also fluidly coupled to and extends through the respective electric machine 106 (the respective powerplant component 142A, 142B), or may alternatively be fluidly coupled to and extend through a heat exchanger thermally coupled to the respective electric machine 106 (the respective powerplant component 142A, 142B). The present disclosure, however, is not limited to such an exemplary EM fluid circuit arrangement. For example, while each EM circuit reservoir 150 is shown as being downstream of the respective electric machine 106 and upstream of the EM circuit heat exchangers 152, 154 and 156 along the respective EM circuit path 148, it is contemplated that EM circuit reservoir 150 may alternatively be arranged upstream of the respective electric machine 106 and downstream of the EM circuit heat exchangers 152, 154 and 156 along the respective EM circuit path 148. In another example, it is contemplated the EM circuit heat exchangers 152, 154 and 156 may be reordered along the respective EM circuit path 148. In still another example, it is contemplated the EM circuit pump 158 may be arranged at other locations along the respective EM circuit path 148.

Each EM circuit reservoir 150 is configured to contain a quantity of the respective EM working fluid before, during and/or after EM fluid circuit operation. Each EM circuit reservoir 150, for example, may be configured as or otherwise include a tank, a cylinder, a pressure vessel, a bladder or any other type of (e.g., liquid) storage container.

The EM circuit LWF heat exchanger 152 includes one or more internal EM circuit passages 164 and one or more internal lubricant circuit passages 166. Each of these heat exchanger passages 164, 166 may be partially or completely formed by the EM circuit LWF heat exchanger 152. The EM circuit passages 164 may form at least a section of or may otherwise be fluidly coupled inline with the respective EM circuit path 148. The lubricant circuit passages 166 may form at least a section of or may otherwise be fluidly coupled inline with a path 168 of the lubricant circuit 160. These lubricant circuit passages 166 are fluidly independent from each set of the EM circuit passages 164 within the EM circuit LWF heat exchanger 152. Each set of the EM circuit passages 164 and the lubricant circuit passages 166 may be arranged to configure the EM circuit LWF heat exchanger 152 as a crossflow heat exchanger, a counterflow heat exchanger, a parallel flow heat exchanger, or a hybrid heat exchanger with a combination crossflow, counterflow and/or parallel flow arrangement for that respective set of the EM circuit passages 164 and the lubricant circuit passages 166. Moreover, the sets of the EM circuit passages 164 may be arranged to configure the EM circuit LWF heat exchanger 152 as a crossflow heat exchanger, a counterflow heat exchanger, a parallel flow heat exchanger, or a hybrid heat exchanger with a combination crossflow, counterflow and/or parallel flow arrangement for those sets of the EM circuit passages 164. The EM circuit LWF heat exchanger 152 may thereby be configured to tune (e.g., maximize) heat transfer between each EM fluid circuit 144 and the lubricant circuit 160 and/or between the first EM fluid circuit 144A and the second EM fluid circuit 144B.

The EM circuit FWF heat exchanger 154 includes one or more internal EM circuit passages 170 and one or more internal fuel circuit passages 172. Each of these heat exchanger passages 170, 172 may be partially or completely formed by the EM circuit FWF heat exchanger 154. The EM circuit passages 170 may form at least a section of or may otherwise be fluidly coupled inline with the respective EM circuit path 148. The fuel circuit passages 172 may form at least a section of or may otherwise be fluidly coupled inline with a path 174 of the fuel circuit 162. These fuel circuit passages 172 are fluidly independent from the EM circuit passages 170 within the EM circuit FWF heat exchanger 154. Each set of the EM circuit passages 170 and the fuel circuit passages 172 may be arranged to configure the EM circuit FWF heat exchanger 154 as a crossflow heat exchanger, a counterflow heat exchanger, a parallel flow heat exchanger, or a hybrid heat exchanger with a combination crossflow, counterflow and/or parallel flow arrangement for that respective set of the EM circuit passages 170 and the fuel circuit passages 172. Moreover, the sets of EM circuit passages 170 may be arranged to configure the EM circuit FWF heat exchanger 154 as a crossflow heat exchanger, a counterflow heat exchanger, a parallel flow heat exchanger, or a hybrid heat exchanger with a combination crossflow, counterflow and/or parallel flow arrangement for those sets of the EM circuit passages 170. The EM circuit FWF heat exchanger 154 may thereby be configured to tune (e.g., maximize) heat transfer between each EM fluid circuit 144 and the fuel circuit 162 and/or between the first EM fluid circuit 144A and the second EM fluid circuit 144B.

Each EM circuit heat exchanger 156 may be configured as an air-to-working fluid heat exchanger; e.g., a radiator. Each EM circuit heat exchanger 156 may be dedicated to the respective EM fluid circuit 144; however, the present disclosure is not limited to such an exemplary arrangement. Each EM circuit heat exchanger 156 includes one or more internal EM circuit passages 176 and one or more internal air circuit passages 178. Each of these heat exchanger passages 176, 178 may be partially or completely formed by the EM circuit heat exchanger 156. The EM circuit passages 176 may form at least a section of or may otherwise be fluidly coupled inline with the respective EM circuit path 148. The air circuit passages 178 may form at least a section of or may otherwise be fluidly coupled inline with a path 180 of an air circuit 182 which receives air from an air source such as the bypass flowpath 54 (see FIG. 1), the core flowpath 52 (see FIG. 1), the external environment 92 (see FIG. 1) or otherwise. The air circuit passages 178 are fluidly independent from the respective EM circuit passages 176 within the EM circuit heat exchanger 156. The EM circuit passages 176 and the air circuit passages 178 may be arranged to configure the EM circuit heat exchanger 156 as a crossflow heat exchanger, a counterflow heat exchanger, a parallel flow heat exchanger, or a hybrid heat exchanger with a combination crossflow, counterflow and/or parallel flow arrangement.

Each EM circuit pump 158 of FIG. 4 is configured to direct and/or regulate a flow of the respective EM working fluid through the respective EM circuit path 148 from an outlet from (e.g., a supply of) the respective EM circuit reservoir 150, through the respective EM circuit LWF heat exchanger 152, the respective EM circuit FWF heat exchanger 154 and the respective EM circuit heat exchanger 156, to an inlet into (e.g., a return of) the respective EM circuit reservoir 150.

During operation of each EM fluid circuit 144 of FIG. 4, the EM circuit pump 158 directs (e.g., pumps) relatively cool EM working fluid along the EM circuit path 148 and into the electric machine 106. As the EM working fluid flow within the electric machine 106 (or the heat exchanger thermally coupled to the electric machine 106), heat energy generated by the electric machine 106 may be transferred into the EM working fluid. This heat energy transfer may thereby dissipate the heat energy in (e.g., cool) the electric machine 106 while also heating the EM working fluid. The working fluid may also lubricate one or more internal components within the electric machine 106. The now heated EM working fluid is directed away from the electric machine 106 along the EM circuit path 148 and into and sequentially through the EM circuit heat exchangers 152, 154 and 156. Within the EM circuit LWF heat exchanger 152, at least some of the heat energy previously transferred into the EM working fluid from the electric machine 106 is transferred out of the EM working fluid into the lubricant flowing through the lubricant circuit 160. Heat energy may also be transferred between the EM working fluids through the EM circuit LWF heat exchanger 152. Within the EM circuit FWF heat exchanger 154, at least some of the heat energy previously transferred into the EM working fluid from the electric machine 106 is transferred out of the EM working fluid into the fuel flowing through the fuel circuit 162. Heat energy may also be transferred between the EM working fluids through the EM circuit FWF heat exchanger 154. Within the EM circuit heat exchanger 156, at least some of the heat energy previously transferred into the EM working fluid from the electric machine 106 is transferred out of the EM working fluid into the air flowing through the air circuit 182. The now cooled EM working fluid is directed away from the EM circuit heat exchangers 152, 154 and 156 along the EM circuit path 148 and back into the electric machine 106 for subsequent recirculation. Note, the thermal communication between the first EM fluid circuit 144A and the second EM fluid circuit 144B through the EM circuit inter-circuit heat exchangers 152 and 154 may operate to thermally balance out heat energy carried by the two EM working fluids.

Figure 5:
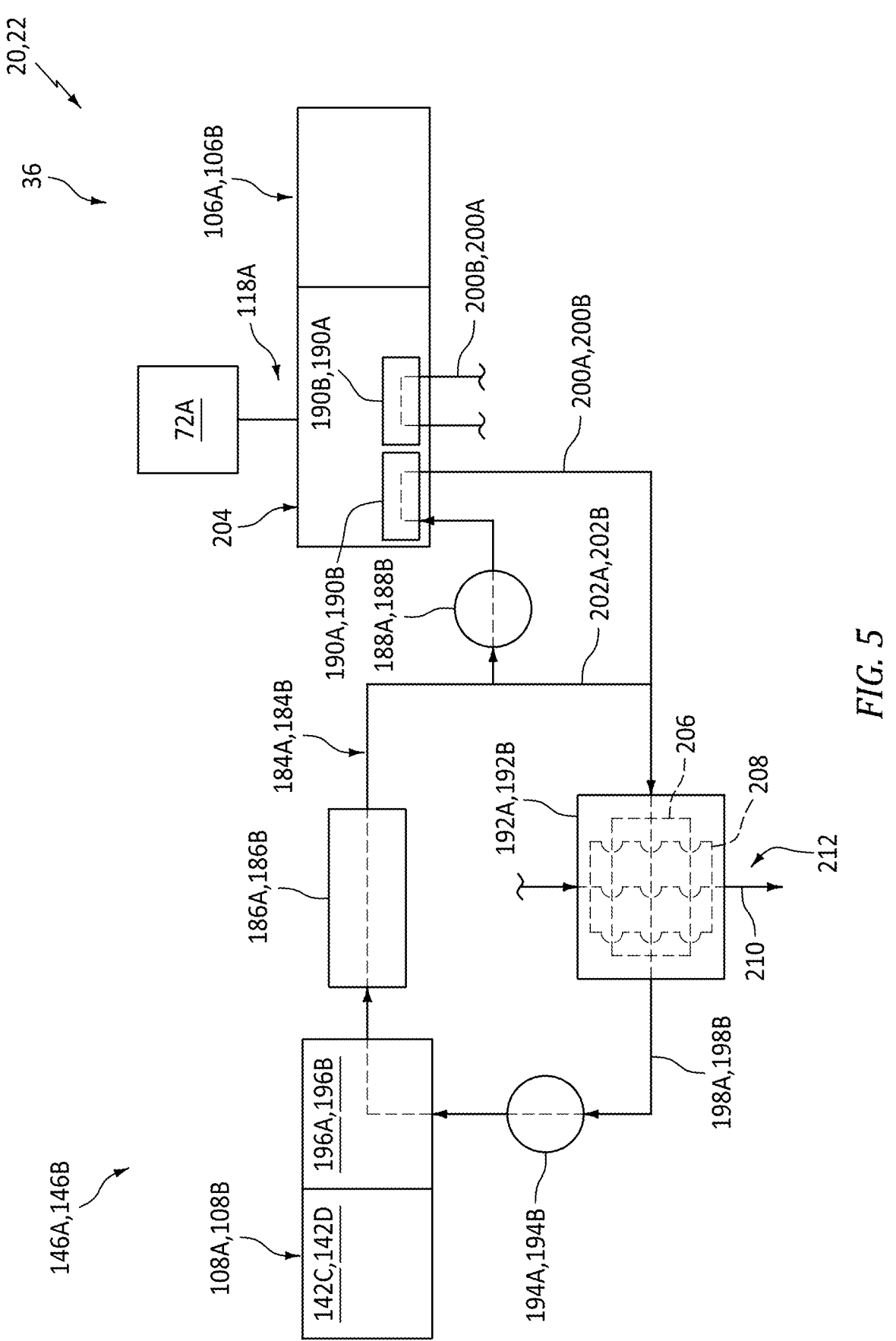
FIG. 5 is a schematic illustration of a portion of the aircraft propulsion system at a controller fluid circuit.

Referring to FIG. 5, each controller fluid circuit 146A, 146B includes a controller circuit path 184A, 184B (generally referred to as "184"), which controller circuit path 184 is discrete (e.g., fluidly decoupled, fluidly independent) from the other fluid circuits 144, 146 of FIG. 3. Each controller fluid circuit 146A, 146B includes a controller circuit reservoir 186A, 186B (generally referred to as "186"), a controller circuit flow regulator 188A, 188B (generally referred to as "188"), a controller circuit fluid actuator 190A, 190B (generally referred to as "190"), a controller circuit heat exchanger 192A, 192B (generally referred to as "192") and a controller circuit pump 194A, 194B (generally referred to as "194"). The controller circuit members 186, 188, 190, 192 and 194 in each controller fluid circuit 146 may be structurally and/or operationally independent from the like controller circuit members 186, 188, 190, 192 and 194 in the other controller fluid circuit 146. Of course, it is contemplated each controller fluid circuit 146 may (or may not) also include one or more additional components arranged along its respective EM circuit path 148 such as, but not limited to, filter(s), sensor(s), additional heat exchanger(s), additional powerplant component(s), valve(s), pump(s), etc.

In each controller fluid circuit 146, the controller circuit reservoir 186, the controller circuit flow regulator 188, the controller circuit fluid actuator 190, the controller circuit heat exchanger 192 and the controller circuit pump 194 may be arranged inline along the respective controller circuit path 184. Each controller circuit path 184 may also be thermally coupled to the EM controller 108 (the respective powerplant component 142C, 142D) through a powerplant component heat exchanger 196A, 196B (generally referred to as "196") such as cooling plate, or may alternatively be fluidly coupled to and extend through the EM controller 108 (the respective powerplant component 142C, 142D). Each controller circuit path 184 of FIG. 5, for example, includes a component leg 198A, 198B (generally referred to as "198"), an actuator leg 200A, 200B (generally referred to as "200") (e.g., a transmission leg) and a bypass leg 202A, 202B (generally referred to as "202"). The component leg 198 of FIG. 5 extends serially through the controller circuit heat exchanger 192, the controller circuit pump 194, the powerplant component heat exchanger 196 (or the respective powerplant component 142C, 142D) from a first end of the component leg 198 to a second end of the component leg 198. The actuator leg 200 and the bypass leg 202 are fluidly coupled in parallel with the component leg 198 between the component leg first end and the component leg second end. The actuator leg 200 extends through the controller circuit flow regulator 188 and the controller circuit fluid actuator 190. The controller circuit fluid actuator 190 is arranged fluidly between the controller circuit flow regulator 188 and the controller circuit heat exchanger 192. The bypass leg 202 bypasses the controller circuit fluid actuator 190 and the controller circuit flow regulator 188. The present disclosure, however, is not limited to such an exemplary control fluid circuit arrangement. For example, the controller circuit flow regulator 188 may alternatively be arranged fluidly between the controller circuit fluid actuator 190 and the controller circuit reservoir 186. The controller circuit flow regulator 188 may alternatively be arranged at an upstream or downstream junction between the component leg 198, the actuator leg 200 and the bypass leg 202. While the controller circuit reservoir 186 is shown as being downstream of the respective EM controller 108 and upstream of the controller circuit fluid actuator 190 and/or the controller circuit heat exchanger 192 along the respective controller circuit path 184, it is contemplated that controller circuit reservoir 186 may alternatively be arranged upstream of the respective EM controller 108 and downstream of the controller circuit fluid actuator 190 and/or the controller circuit heat exchanger 192 along the respective controller circuit path 184.

Each controller circuit reservoir 186 is configured to contain a quantity of the respective controller working fluid before, during and/or after controller fluid circuit operation. Each controller circuit reservoir 186, for example, may be configured as or otherwise include a tank, a cylinder, a pressure vessel, a bladder or any other type of (e.g., liquid) storage container.

Each controller circuit flow regulator 188 of FIG. 5 is configured to regulate a flow of the controller working fluid (a) directed into the actuator leg 200 from the component leg 184 and/or (b) directed through the actuator leg 200 to (or from) the controller circuit fluid actuator 190. Each controller circuit flow regulator 188, for example, may be configured as or otherwise include a flow diverter, a valve or a valve system. Where each controller circuit flow regulator 188 is a valve (or a valve system), that controller circuit flow regulator 188 may be opened during a first mode such that the controller working fluid flows through the controller circuit flow regulator 188 to (or from) the controller circuit fluid actuator 190. By contrast, the respective controller circuit flow regulator 188 may be closed during a second mode such that the controller circuit flow regulator 188 block (or diverts) the controller working fluid from flowing to (or from) the controller circuit fluid actuator 190. Rather, the controller working fluid will flow through the bypass leg 202 and bypass the controller circuit fluid actuator 190. Of course, it is contemplated the respective controller circuit flow regulator 188 may also partially open such that (a) some of the controller working fluid flows to (or from) the controller circuit fluid actuator 190 and (b) some of the controller working fluid bypasses the actuator leg 200.

The controller circuit fluid actuators 190 may be configured as part of (e.g., integrated in) a common fluidly actuated component of the aircraft propulsion system 22 such as a transmission 204; e.g., a multi-speed transmission or a variable speed transmission. This transmission 204 may be configured as part of one of the engine-electric machine drivetrains 118. For case of description, the transmission 204 of FIG. 5 may be described below as being part of the engine-electric machine drivetrains 118A. The transmission 204 may thereby operably couple the low speed rotating structure 72A and the first electric machine 106A and its first machine rotor 110A (see FIG. 2) together. However, it is contemplated the transmission 204 may alternatively be configured as part of the engine-electric machine drivetrains 118B (see FIG. 2). Referring again to FIG. 5, the controller circuit fluid actuators 190 are configured to actuate an operation in the transmission 204. The controller circuit fluid actuators 190, for example, may be configured to adjust a gearing ratio of the transmission 204. In some embodiments, the controller circuit fluid actuators 190 may both be configured to actuate a common operation in the transmission 204. In other embodiments, the controller circuit fluid actuators 190 may be configured to actuate different operations in the transmission 204.

Each controller circuit heat exchanger 192 may be configured as an air-to-working fluid heat exchanger; e.g., a radiator. Each controller circuit heat exchanger 192 may be dedicated to the respective controller fluid circuit 146; however, the present disclosure is not limited to such an exemplary arrangement. Each controller circuit heat exchanger 192 includes one or more internal controller circuit passages 206 and one or more internal air circuit passages 208. Each of these heat exchanger passages 206, 208 may be partially or completely formed by the controller circuit heat exchanger 192. The controller circuit passages 206 may form at least a section of or may otherwise be fluidly coupled inline with the respective controller circuit path 184 and its component leg 198. The air circuit passages 208 may form at least a section of or may otherwise be fluidly coupled inline with a path 210 of an air circuit 212 (or the air circuit 182) which receives air from an air source such as the bypass flowpath 54 (see FIG. 1), the core flowpath 52 (see FIG. 1), the external environment 92 (see FIG. 1) or otherwise. The air circuit passages 208 are fluidly independent from the respective controller circuit passages 206 within the controller circuit heat exchanger 192. The controller circuit passages 206 and the air circuit passages 208 may be arranged to configure the controller circuit heat exchanger 192 as a crossflow heat exchanger, a counterflow heat exchanger, a parallel flow heat exchanger, or a hybrid heat exchanger with a combination crossflow, counterflow and/or parallel flow arrangement.

Each controller circuit pump 194 of FIG. 5 is configured to direct and/or regulate a flow of the respective controller working fluid through the respective controller circuit path 184 from an outlet from (e.g., a supply of) the respective controller circuit reservoir 186, optionally through the respective controller circuit flow regulator 188 and the controller circuit fluid actuator 190, through the respective controller circuit heat exchanger 192, to an inlet into (e.g., a return of) the respective controller circuit reservoir 186.

During operation of each controller fluid circuit 146 of FIG. 5, the controller circuit pump 194 directs (e.g., pumps) relatively cool controller working fluid along the controller circuit path 184 and into the powerplant component heat exchanger 196. As the controller working fluid flow within the powerplant component heat exchanger 196 (or through the EM controller 108), heat energy generated by the EM controller 108 may be transferred into the controller working fluid. This heat energy transfer may thereby dissipate the heat energy in (e.g., cool) the EM controller 108 while also heating the controller working fluid. The now heated controller working fluid is directed away from the powerplant component heat exchanger 196/the EM controller 108 along the controller circuit path 184 and into and through the controller circuit heat exchanger 192. Within the controller circuit heat exchanger 192, at least some of the heat energy previously transferred into the controller working fluid from the EM controller 108 is transferred out of the controller working fluid into the air flowing through the air circuit 212. The now cooled controller working fluid is directed away from the controller circuit heat exchanger 192 along the controller circuit path 184 and back into the powerplant component heat exchanger 196 for subsequent recirculation. When the controller circuit flow regulator 188 is open, the controller working fluid may also flow through the actuator leg 200 to facilitate actuation of the transmission 204. When the controller circuit flow regulator 188 is closed, the controller working fluid may bypass the actuator leg 200.

Figure 6:
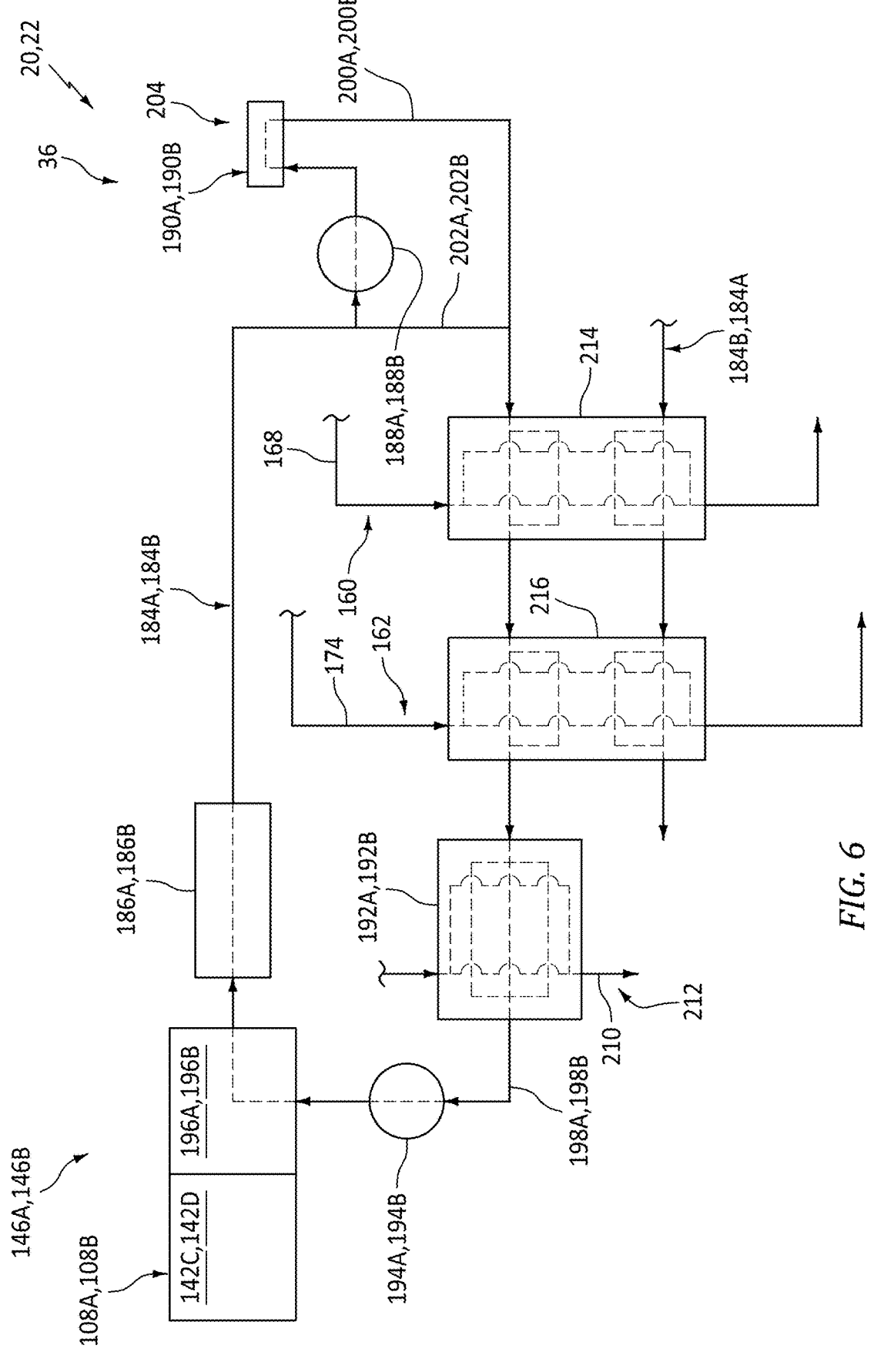
FIG. 6 is a schematic illustration of a portion of the aircraft propulsion system at the controller fluid circuit with another heat exchanger arrangement.

In some embodiments, referring to FIG. 6, one or both of the controller fluid circuits 146A and/or 146B may also be configured with a controller circuit lubricant-to-working fluid (LWF) heat exchanger 214 and/or a controller circuit fuel-to-working fluid (FWF) heat exchanger 216. The controller circuit LWF heat exchanger 214 may be configured as part of the lubricant circuit 160. This controller circuit LWF heat exchanger 214 may have a similar configuration of internal passages as described above with respect to the EM circuit LWF heat exchangers 152 of FIG. 4. The controller circuit FWF heat exchanger 216 may be configured as part of the fuel circuit 162. This controller circuit FWF heat exchanger 216 may have a similar configuration of internal passages as described above with respect to the EM circuit FWF heat exchangers 154 of FIG. 4.

Figure 7:
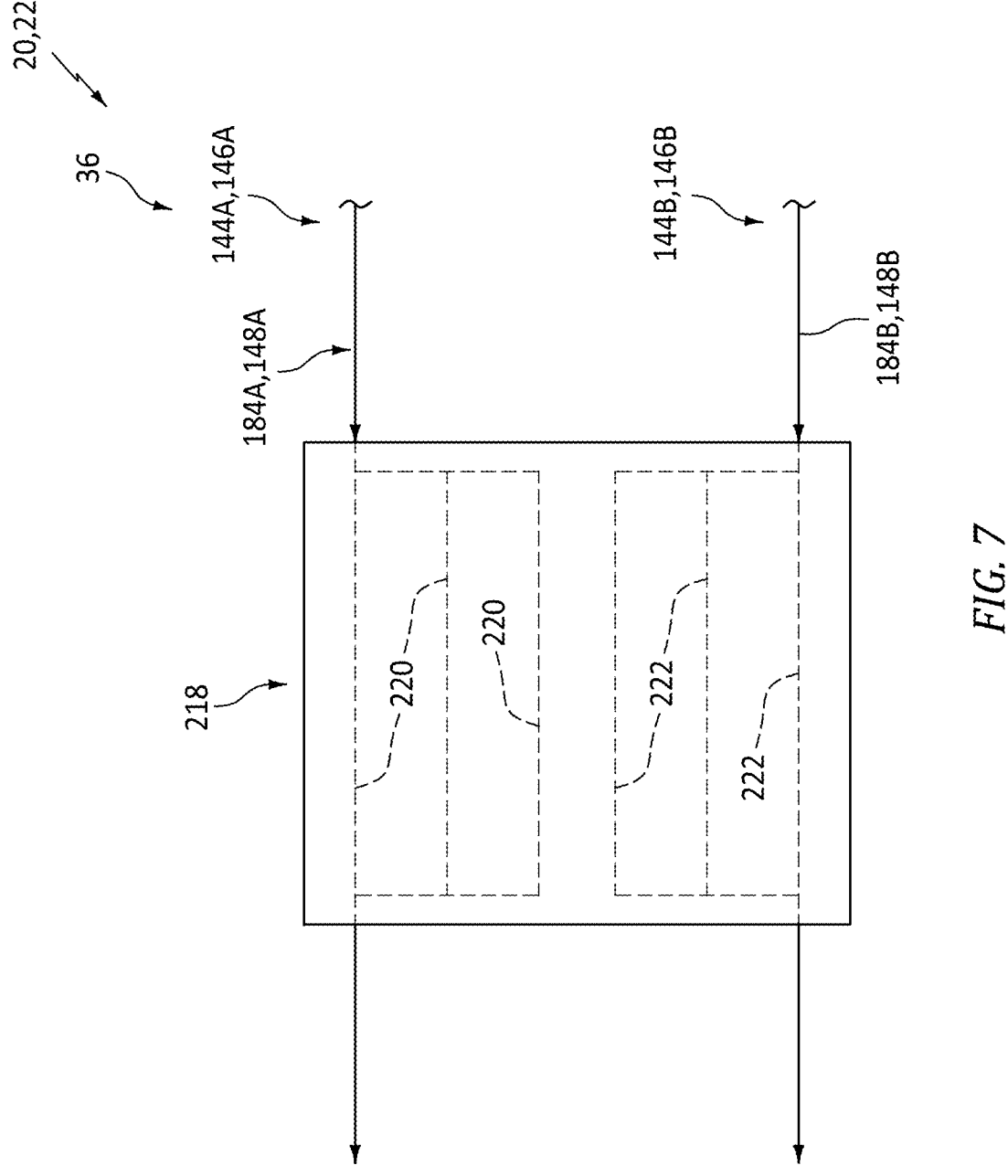
FIG. 7 is a schematic illustration of an inter-circuit heat exchanger.

In some embodiments, referring to FIG. 7, any set of the fluid circuits 144, 146 may be configured with a shared inter-circuit heat exchanger 218. This inter-circuit heat exchanger 218 is configured (and may be dedicated) to transferring heat energy between the working fluids flowing through the respective set of the fluid circuits 144, 146. The inter-circuit heat exchanger 218 of FIG. 7 includes one or more internal first circuit passages 220 and one or more internal second circuit passages 222. Each of these heat exchanger passages 220, 222 may be partially or completely formed by the inter-circuit heat exchanger 218. The first circuit passages 220 may form at least a section of or may otherwise be fluidly coupled inline with the first circuit path 148A, 184A. The second circuit passages 222 may form at least a section of or may otherwise be fluidly coupled inline with the second circuit path 148B, 184B. The second circuit passages 222 are fluidly independent from the first circuit passages 220 within the inter-circuit heat exchanger 218. The first circuit passages 220 and the second circuit passages 222 may be arranged to configure the inter-circuit heat exchanger 218 as a crossflow heat exchanger, a counterflow heat exchanger, a parallel flow heat exchanger, or a hybrid heat exchanger with a combination crossflow, counterflow and/or parallel flow arrangement.

Figure 8:
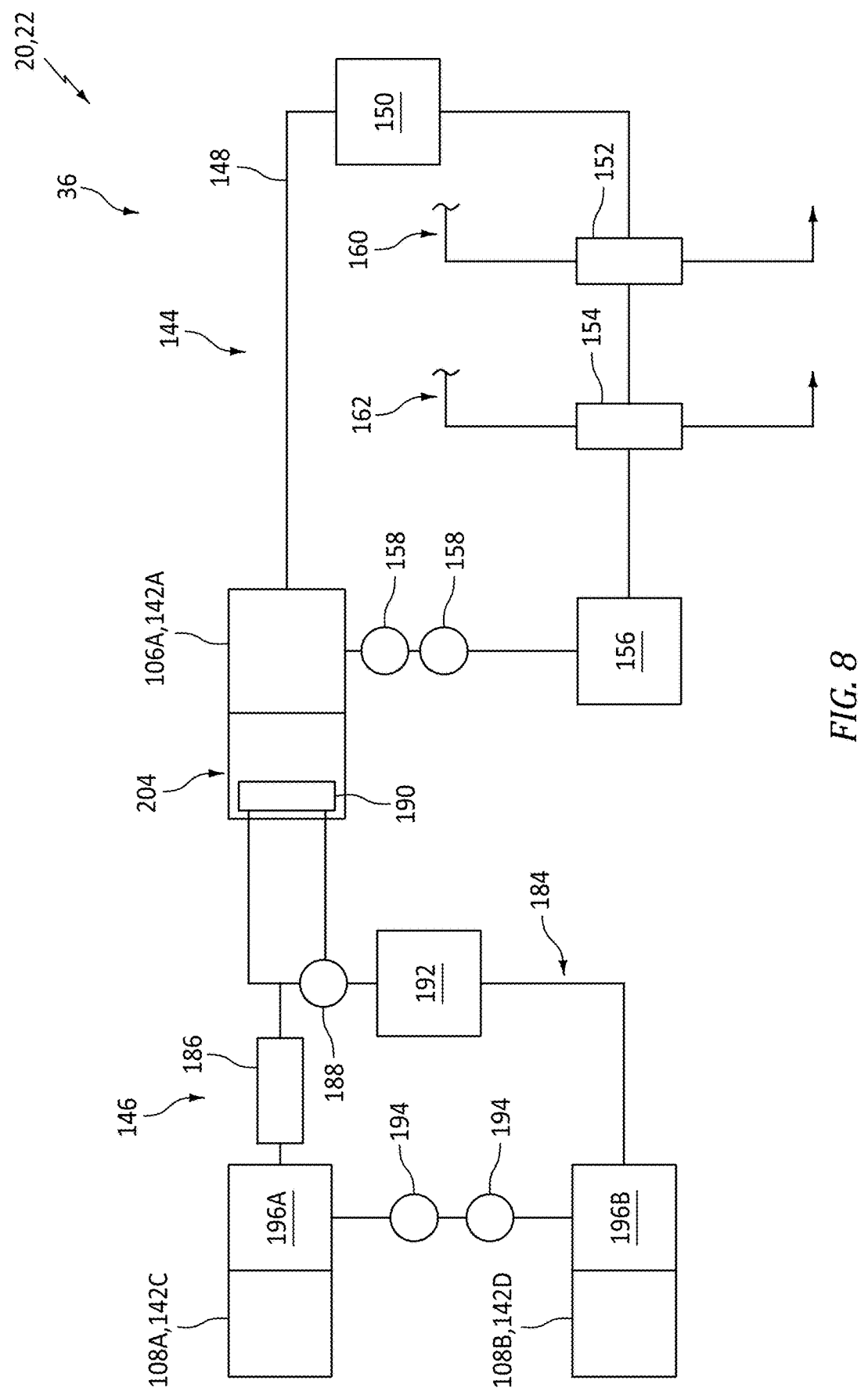
FIG. 8 is a schematic illustration of a portion of the aircraft propulsion system at the working fluid system with another fluid circuit arrangement.
Figure 9:
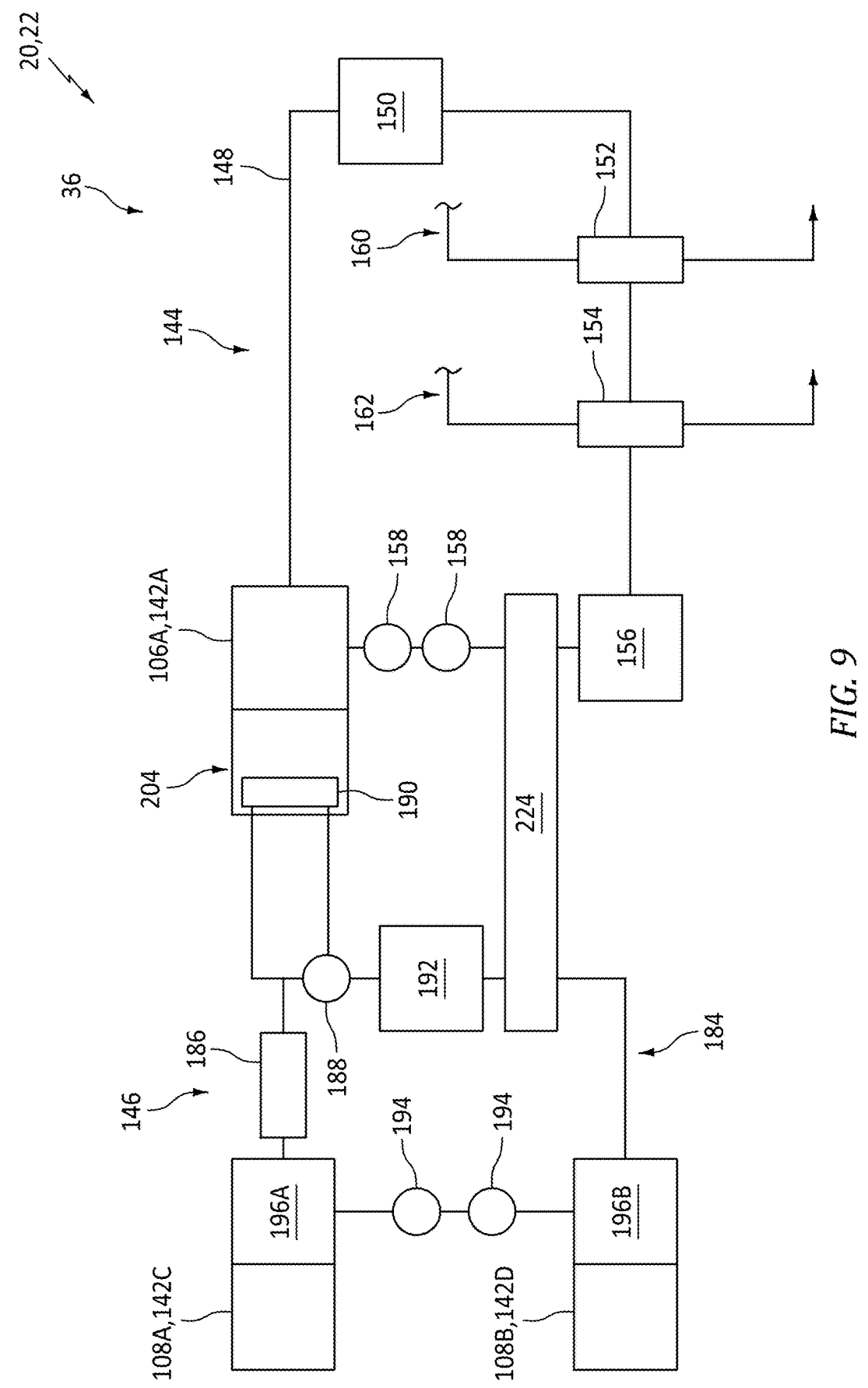
FIG. 9 is a schematic illustration of a portion of the aircraft propulsion system at the working fluid system with still another fluid circuit arrangement.

The fluid circuits 144, 146 are described above as fluidly independent circuits. It is contemplated, however, any two or more of the fluid circuits 144, 146 may be combined together into a single common fluid circuit. For example, referring to FIG. 8, both of the EM controllers 108A and 108B (both of the third and the fourth powerplant components 142C and 142D) may be serviced by a common controller fluid circuit 146. This controller fluid circuit 146 may be configured similar to any one of the controller fluid circuits 146A, 146B described above. However, the controller fluid circuit 146 of FIG. 8 may include multiple of the controller circuit pumps 194. Here, the controller circuit pumps 194 may be electric pumps, mechanical pumps, or one of each of an electric pump and a mechanical pump. Similarly, both of the electric machines 106A and 106B (both of the first and the second powerplant components 142A and 142B) may be serviced by a common electric machine (EM) fluid circuit 144. This EM fluid circuit 144 may be configured similar to any one of the EM fluid circuits 144A, 144B described above. However, the EM fluid circuit 144 of FIG. 8 may include multiple of the EM circuit pumps 158. Here, the EM circuit pumps 158 may be electric pumps, mechanical pumps, or one of each of an electric pump and a mechanical pump. Moreover, referring to FIG. 9, it is contemplated the controller fluid circuit 146 may be thermally coupled to the EM fluid circuit 144 by a shared inter-circuit heat exchanger 224. This inter-circuit heat exchanger 224 is configured (and may be dedicated) to transferring heat energy between the working fluids flowing through the respective set of the fluid circuits 144 and 146. The inter-circuit heat exchanger 224 of FIG. 9 may have a similar configuration to the inter-circuit heat exchanger 218 of FIG. 7.

Figure 10B:
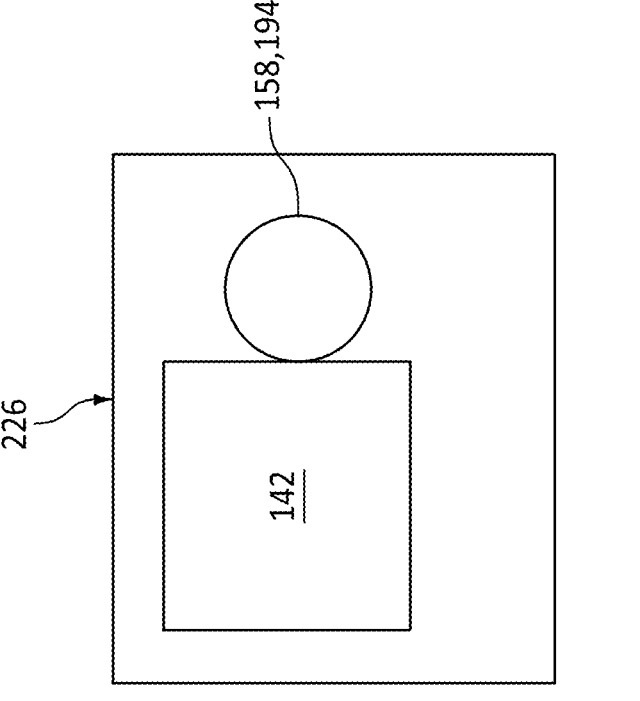
FIGS. 10A and 10B are schematic illustrations of various powerplant component module arrangements.
Figure 10A:
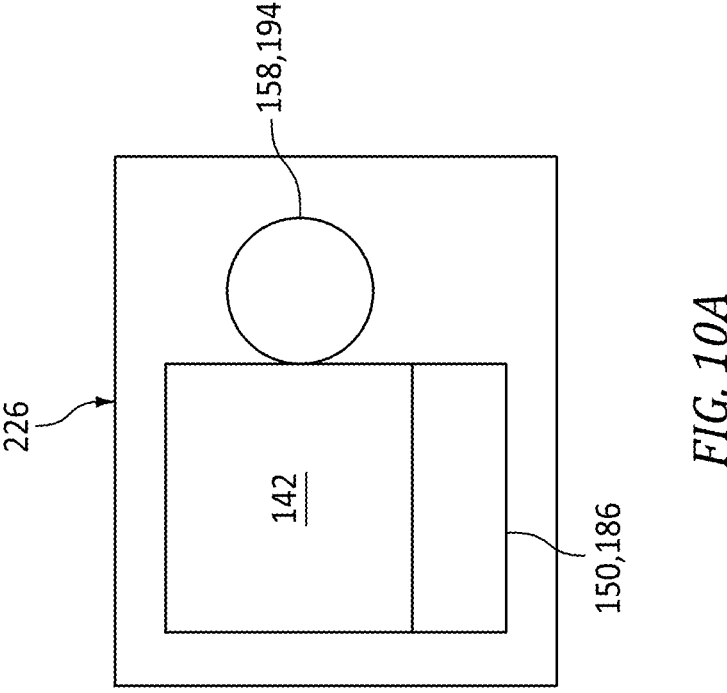

In some embodiments, referring to FIGS. 10A and 10B, any one or more of the powerplant components 142 may each be configured in a respective module 226 (e.g., a line replaceable unit (LRU)) with the circuit reservoir 150, 186 and/or the circuit pump 158, 194 from that same fluid circuit. With this arrangement, all of the fluid circuit members 142, (150, 186) and/or (158, 194) may be collectively installed or removed as one unit to facilitate faster inspection, maintenance, assembly of the working fluid system 36. It is contemplated such module(s) 226 may be utilized with any one of the fluid circuits described above.

The aircraft propulsion system 22 of FIG. 1 is described above as a ducted propulsor propulsion system; e.g., the turbofan propulsion system. The present disclosure, however, is not limited to such an exemplary aircraft propulsion system. For example, referring to FIG. 11, the outer housing structure 30 (see FIG. 1) may be omitted from the propulsion system housing 26 to open the propulsor rotor 64 up to the external environment 92. More particularly, the propulsor rotor 64 of FIG. 11 includes a plurality of open propulsor blades 228 arranged circumferentially about the propulsion system axis 38 in an array; e.g., a circular array. This array of the propulsor blades 228 may be unshrouded or alternatively shrouded by a tubular propulsor rotor shroud dedicated to the propulsor rotor 64 for example. Each of these propulsor blades 228 projects spanwise (e.g., radially) out from a base of the propulsor rotor 64, into the external environment 92, to a distal tip 230 of the respective propulsor blade 228. Each propulsor blade 228 is thereby configured as an un-ducted propulsor blade which is exposed to (e.g., disposed in) the surrounding external environment 92. With this arrangement, the propulsor rotor 64 is an open propulsor rotor (e.g., an un-ducted propulsor rotor) and the aircraft propulsion system 22 is configured as an open rotor propulsion system. Moreover, the inner housing structure 28 and its nacelle structure 82 may form an exterior of the aircraft propulsion system 22 and may border the external environment 92.

The guide vane structure 32 may also be open to the external environment 92 forming an open guide vane structure. This guide vane structure 32 of FIG. 11 includes a plurality of open exit guide vanes 232; e.g., airfoils. The guide vanes 232 are arranged and may (or may not) be equispaced circumferentially about the propulsion system axis 38 in an array; e.g., a circular array. This array of the guide vanes 232 may be unshrouded or alternatively shrouded by a tubular guide vane shroud dedicated to the guide vane structure 32 for example. This guide vane structure 32 and its guide vanes 232 are arranged axially next to (e.g., adjacent) the propulsor rotor 64 and its propulsor blades 228. The guide vane structure 32 and its guide vanes 232 of FIG. 11, for example, are arranged downstream of the propulsor rotor 64 and its propulsor blades 228, without (e.g., any) other elements axially therebetween to obstruct, turn and/or otherwise influence the air propelled by the propulsor rotor 64 to the guide vane structure 32. Each of the guide vanes 232 projects radially out from an exterior surface of the inner housing structure 28, into the external environment 92, to a distal tip 234 of the respective guide vane 232. Each guide vane 232 is thereby configured as an un-ducted guide vane which is exposed to (e.g., disposed in) the surrounding external environment 92. With the foregoing arrangement, the guide vane structure 32 and its guide vanes 232 are configured to condition (e.g., straighten out, de-swirl, etc.) an outer stream of air propelled by the propulsor rotor 64 within the external environment 92 that bypass the engine core 50. Of course, in other embodiments, the guide vane structure 32 may be omitted where, for example, the aircraft propulsion system 22 is alternatively configured as a counter-rotating open rotor (CROR) aircraft propulsion system, etc.

Figure 11:
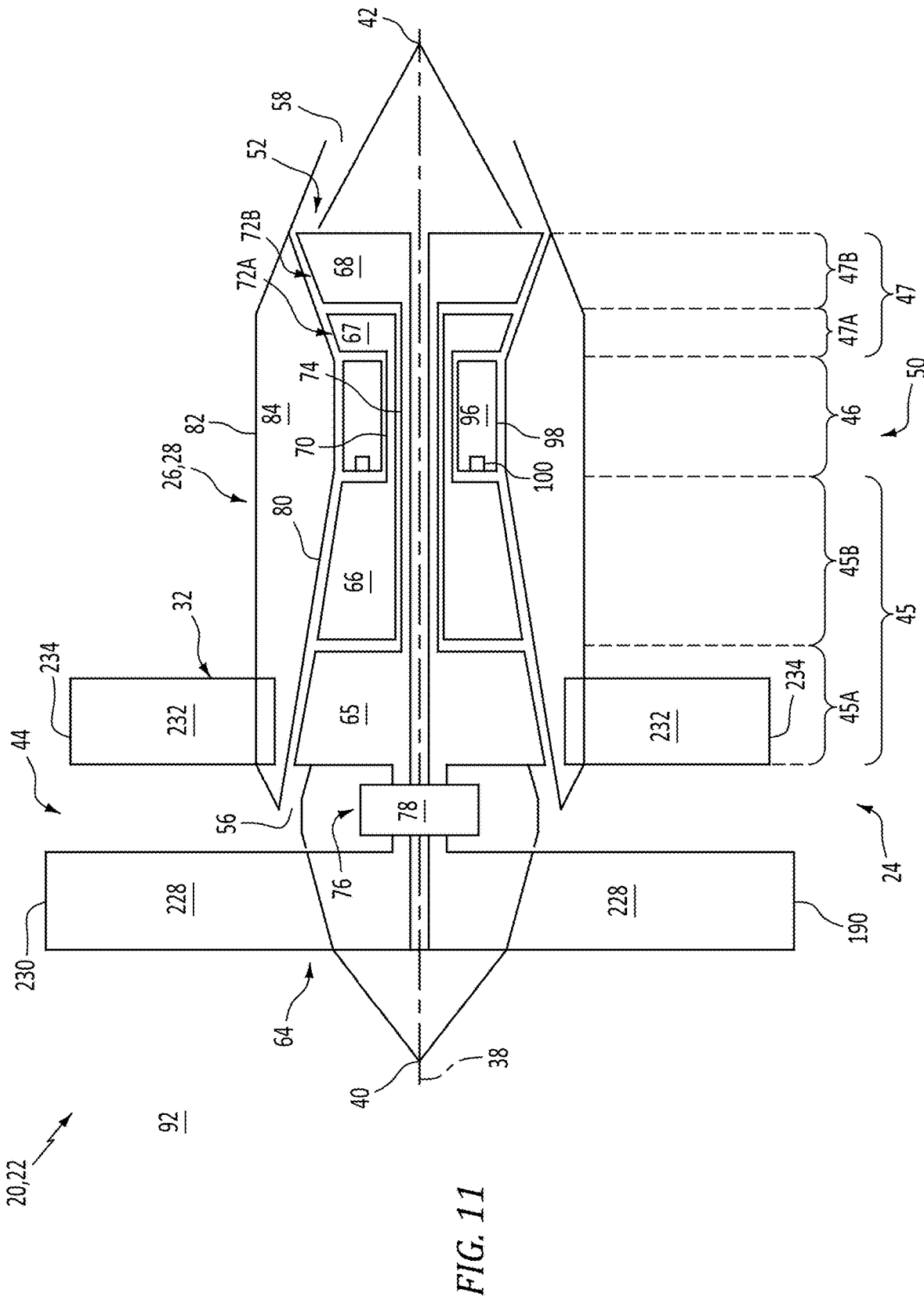
FIG. 11 is a partial schematic illustration of the aircraft propulsion system with an open propulsor rotor.

While the turbine engine 24 in FIG. 1 and FIG. 11 is shown with a particular two rotating structure arrangement, the present disclosure is not limited thereto. For example, the LPC rotor 65 may be omitted to configure the LPT rotor 68 as a power turbine (PT) rotor for the propulsor rotor 64. In another example, the turbine engine 24 may also include another rotating structure; e.g., an intermediate speed spool for the turbine engine 24 and its engine core 50.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:
   a first electric machine comprising a first powerplant component;
   a second electric machine comprising a second powerplant component;
   a first inter-circuit heat exchanger;
   a first fluid circuit configured to service the first powerplant component using a first working fluid in the first fluid circuit, the first fluid circuit including a first circuit reservoir, a first circuit pump and a first circuit path extending through the first circuit reservoir, the first circuit pump and the first inter-circuit heat exchanger; and
   a second fluid circuit fluidly independent of the first fluid circuit, the second fluid circuit configured to service the second powerplant component using a second working fluid in the second fluid circuit, the second fluid circuit including a second circuit reservoir, a second circuit pump and a second circuit path extending through the second circuit reservoir, the second circuit pump and the first inter-circuit heat exchanger.

2. The assembly of claim 1, wherein the first inter-circuit heat exchanger is dedicated to transferring heat energy between the first working fluid in the first fluid circuit and the second working fluid in the second fluid circuit.

3. The assembly of claim 1, further comprising a lubricant circuit comprising a lubricant circuit path extending through the first inter-circuit heat exchanger.

4. The assembly of claim 1, further comprising a fuel circuit comprising a fuel circuit path extending through the first inter-circuit heat exchanger.

5. The assembly of claim 4, further comprising:

a second inter-circuit heat exchanger fluidly coupled inline along the first circuit path and the second circuit path; and a lubricant circuit comprising a lubricant circuit path extending through the second inter-circuit heat exchanger.

6. The assembly of claim 1, wherein the first fluid circuit further includes a first circuit heat exchanger, and the first circuit path further extending through the first circuit heat exchanger; and the second fluid circuit further includes a second circuit heat exchanger, and the second circuit path further extending through the second circuit heat exchanger.

7. The assembly of claim 1, wherein at least one of the first circuit path further extends through the first powerplant component; or the second circuit path further extends through the second powerplant component.

8. The assembly of claim 1, further comprising at least one of a first component heat exchanger thermally coupling the first powerplant component to the first working fluid in the first fluid circuit, the first circuit path further extending through the first component heat exchanger; or a second component heat exchanger thermally coupling the second powerplant component to the second working fluid in the second fluid circuit, the second circuit path further extending through the second component heat exchanger.

9. The assembly of claim 1, wherein at least one of the first circuit pump is configured with the first powerplant component in a first line replaceable unit; or the second circuit pump is configured with the second powerplant component in a second line replaceable unit.

10. The assembly of claim 1, wherein at least one of the first circuit reservoir is configured with the first powerplant component in a first line replaceable unit; or the second circuit reservoir is configured with the second powerplant component in a second line replaceable unit.

11. The assembly of claim 1, wherein the first fluid circuit further includes an additional first circuit pump fluidly coupled inline along the first circuit path.

12. An assembly for an aircraft powerplant, comprising:

a first electric machine controller comprising a first powerplant component;

a second electric machine controller comprising a second powerplant component;

a first inter-circuit heat exchanger;

a first fluid circuit configured to service the first powerplant component using a first working fluid in the first fluid circuit, the first fluid circuit including a first circuit reservoir, a first circuit pump and a first circuit path extending through the first circuit reservoir, the first circuit pump and the first inter-circuit heat exchanger; and a second fluid circuit fluidly independent of the first fluid circuit, the second fluid circuit configured to service the second powerplant component using a second working fluid in the second fluid circuit, the second fluid circuit including a second circuit reservoir, a second circuit pump and a second circuit path extending through the second circuit reservoir, the second circuit pump and the first inter-circuit heat exchanger.

13. An assembly for an aircraft powerplant, comprising:

an electric machine comprising a first powerplant component;

an electric machine controller comprising a second powerplant component;

a first inter-circuit heat exchanger;

a first fluid circuit configured to service the first powerplant component using a first working fluid in the first fluid circuit, the first fluid circuit including a first circuit reservoir, a first circuit pump and a first circuit path extending through the first circuit reservoir, the first circuit pump and the first inter-circuit heat exchanger; and a second fluid circuit fluidly independent of the first fluid circuit, the second fluid circuit configured to service the second powerplant component using a second working fluid in the second fluid circuit, the second fluid circuit including a second circuit reservoir, a second circuit pump and a second circuit path extending through the second circuit reservoir, the second circuit pump and the first inter-circuit heat exchanger.

14. The assembly of claim 13, wherein the electric machine controller is configured to control operation of the electric machine.

15. An assembly for an aircraft powerplant, comprising:

a rotating structure comprising a bladed rotor;

an electric machine operatively coupled to the rotating structure;

an electric machine controller configured to control operation of the electric machine; and a fluid circuit configured to cool and/or lubricate at least one of the electric machine or the electric machine controller using a working fluid in the fluid circuit, the fluid circuit including a circuit path, a circuit reservoir, a circuit pump, a radiator, a fuel-to-working fluid heat exchanger and a lubricant-to-working fluid heat exchanger, the circuit path extending through the circuit reservoir, the circuit pump, the radiator, the fuel-to-working fluid heat exchanger and the lubricant-to-working fluid heat exchanger, the radiator configured to transfer first heat energy between the working fluid and air flowing through the radiator, the fuel-to-working fluid heat exchanger configured to transfer second heat energy between the working fluid and fuel flowing through the fuel-to-working fluid heat exchanger, and the lubricant-to-working fluid heat exchanger configured to transfer third heat energy between the working fluid and lubricant flowing through the lubricant-to-working fluid heat exchanger.

* * * * *